United States Patent [19]
Uemura et al.

[11] Patent Number: 5,876,277
[45] Date of Patent: Mar. 2, 1999

[54] AIR CONDITIONING APPARATUS FOR VEHICLE, HAVING DEODORIZING FILTER

[75] Inventors: Yukio Uemura, Owariasahi; Manabu Miyata, Obu; Takuya Natsume; Kazushi Shikata, both of Kariya; Hikaru Sugi, Nagoya; Teruhiko Kameoka, Okazaki; Kazutoshi Kuwayama, Nakashima-Gun; Yuichi Kajino, Nagoya; Takeshi Yoshinori, Okazaki, all of Japan

[73] Assignee: Denso Corporation, Kariya, Japan

[21] Appl. No.: 14,961

[22] Filed: Jan. 28, 1998

[30] Foreign Application Priority Data

| Feb. 4, 1997 | [JP] | Japan | 9-021729 |
| May 21, 1997 | [JP] | Japan | 9-131180 |
| Sep. 10, 1997 | [JP] | Japan | 9-245695 |

[51] Int. Cl.$^6$ ....................................... B60H 3/06
[52] U.S. Cl. ............................ 454/139; 454/158
[58] Field of Search ................... 454/139, 158; 55/385.2, 385.3, 418, 419, 467; 96/135, 139, 140

[56] References Cited

U.S. PATENT DOCUMENTS 4,765,230 8/1988 Soethout et al. ..................... 454/139

FOREIGN PATENT DOCUMENTS

| U-2-17413 | 2/1990 | Japan . |
| A-3-189229 | 8/1991 | Japan . |
| A-4-169323 | 6/1992 | Japan . |
| A-4-252726 | 9/1992 | Japan . |

*Primary Examiner*—Harold Joyce
*Attorney, Agent, or Firm*—Harness, Dickey & Pierce, P.L.C.

[57] ABSTRACT

A deodorizing filter for adsorbing malodorous particles in air is disposed at a downstream air side of a circumferential wall of an inside/outside air switching rotary door which opens and closes inside and outside air intake ports. A gap having a predetermined distance is provided between the deodorizing filter and the circumferential wall of the rotary door. The deodorizing filter is rotated integrally with the rotary door. When the rotary door is rotated to open both the outside and inside air intake ports at their intermediately opened positions, the inside air flowing from the inside air intake port directly flows into an outlet side of an inside/outside air switching box, and the outside air introduced from the outside air intake port passes through the gap and the deodorizing filter and flows into the outlet side of the inside/outside air switching box.

25 Claims, 18 Drawing Sheets

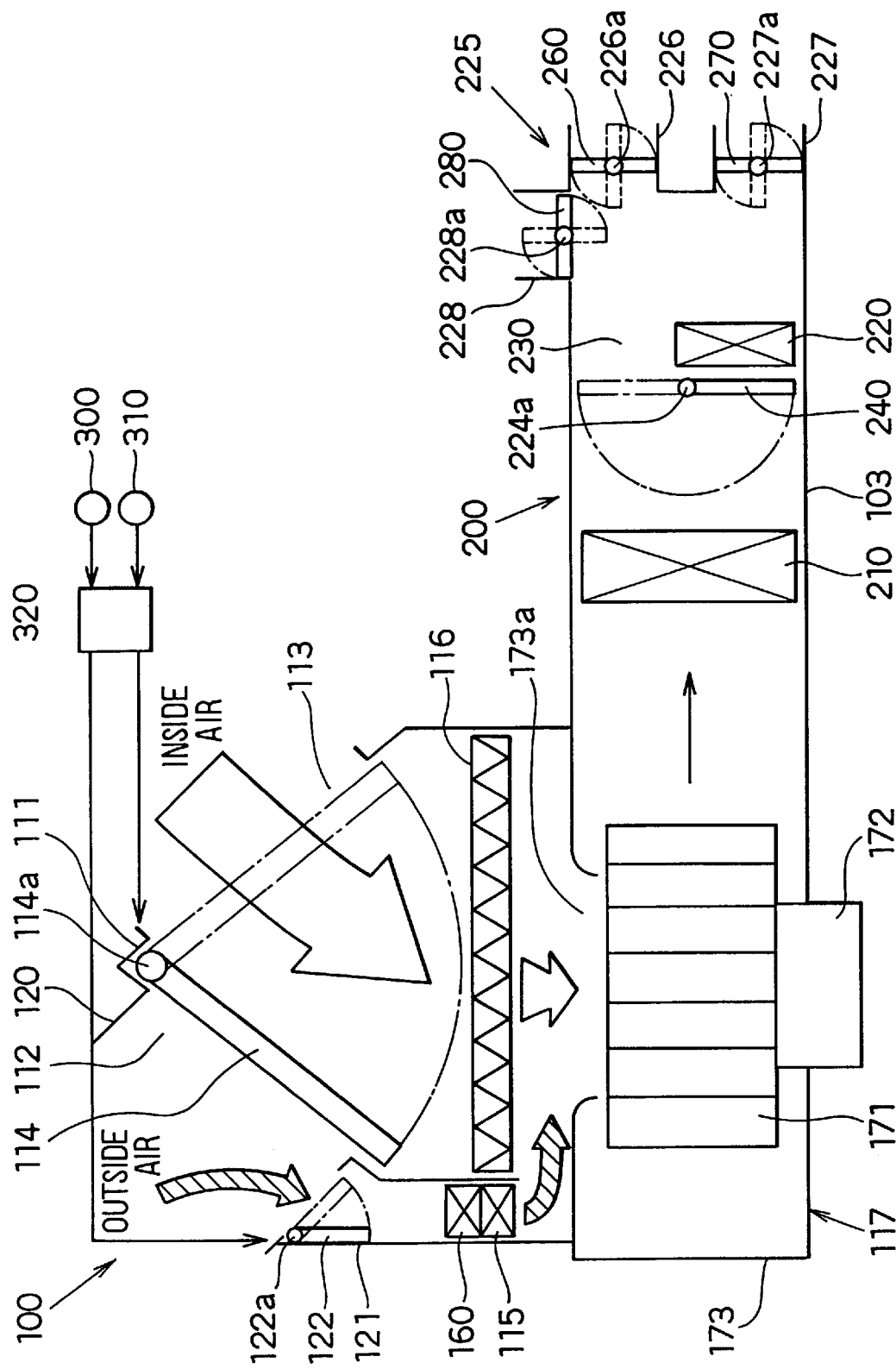

AIR CONDITIONING APPARATUS FOR VEHICLE, HAVING DEODORIZING FILTER

BACKGROUND OF THE INVENTION

1. Field of the Invention

The present invention relates to an air conditioning apparatus for a vehicle, having an inside/outside air switching function and a deodorizing filter function.

2. Description of the Related Art

Drivers of vehicles on the road often find themselves running behind a diesel-powered transport discharging fumes with an unpleasant smell. In such cases, it is customary for the vehicle's driver to shut off a flow of the diesel exhaust gas odor into the vehicle interior by setting the inside/outside air switching device of an air conditioning apparatus to a whole inside air mode, or by setting the same device to a whole outside air mode in which all outside air passes through a deodorizing filter to adsorb malodorous components from the outside air.

However, when the whole inside air mode is maintained for an extended period of time, a $CO_2$ concentration of inside air in a passenger compartment is increased; and therefore, which can adversely affect physiological conditions of the driver and a passenger in the hermetically closed vehicle. Further, in the whole outside air mode, because the all outside air passes through the deodorizing filter, the air volume of the air conditioning apparatus is drastically reduced and the air conditioning capability is lowered correspondingly. Because a ventilation system of the air conditioning apparatus causes high pressure loss, noise of the ventilation system can be appreciably high.

Japanese Utility Model Laid-Open No. Hei 2-17413 proposes an air conditioning apparatus for a vehicle. In the conventional air conditioning apparatus, an arc-shaped circumferential wall of a rotary door is used to switch an inside/outside air intake port, and the rotary door incorporates a deodorizing filter. In the proposed air conditioning apparatus, inside and outside air passes continuously through the deodorizing filter regardless of a whole inside air mode or a whole outside air mode being selected. Therefore, the amount of air passing through the air conditioning apparatus is greatly decreased by the high pressure loss of the deodorizing filter.

SUMMARY OF THE INVENTION

In view of the foregoing problems, it is an object of the present invention to provide an air conditioning apparatus for a vehicle, which ensures both of ventilation in a passenger compartment of the vehicle by introducing outside air and deodorization of the outside air, while preventing an air amount of the air conditioning apparatus from being decreased by a high pressure loss of a deodorizing filter.

It is an another object of the present invention to provide an air conditioning apparatus, for a vehicle, which sets a whole outside air deodorizing mode or a whole inside air deodorizing mode when deodorization of outside air or inside air by a deodorizing filter is given priority over a decrease in air amount caused by the high pressure loss of the deodorizing filter.

According to a first aspect of the present invention, an air conditioning apparatus includes: an inside/outside air switching door having a wall portion for opening and closing an outside air intake port and an inside air intake port; and a first deodorizing filter disposed at a downstream air side of the wall portion to form a gap therebetween. The inside/outside air switching door and the first deodorizing filter are disposed in such a manner that outside air introduced from the outside air intake port flows through an air outlet of an inside/outside air switching box after passing through the gap and the first deodorizing filter; and inside air introduced from the inside air intake port directly flows through the air outlet of the inside/outside air switching box, when the inside/outside air switching door is moved at an intermediate position in which each of the outside air intake port and the inside air intake port is opened in an intermediate opening degree by the wall portion. Therefore, a part of the outside air is mixed into inside air, the outside air passes through the first deodorizing filter, and the mixed air can be introduced into a passenger compartment of the vehicle. Thus, it can prevent outside malodorous particles such as diesel exhaust gas in outside air from flowing into the passenger compartment. Further, because an amount of outside air passing through the deodorizing filter is small, an amount of air to be blown into the passenger compartment can be increased even if the deodorizing filter has a high pressure loss.

Preferably, the inside/outside air switching box includes an auxiliary inside air intake port for introducing inside air therein, and an auxiliary inside air door for opening and closing the auxiliary inside air intake port. The auxiliary inside air door is moved at a position to open the auxiliary inside air intake port and to guide outside air introduced from the outside air intake port into the gap when the inside/outside air switching door is moved at the intermediate position. Therefore, the amount of inside air can be increased by opening the auxiliary inside air door to increase air conditioning capacity, and outside air passing through the deodorizing filter can be smoothly introduced by the auxiliary inside air door.

According to a second aspect of the present invention, an air conditioning apparatus includes: an inside/outside air switching door having a wall portion, disposed in an inside/outside air switching box to open and close an outside air intake port and an inside air intake port by moving the wall portion; a filter support member disposed within the inside/outside air switching box at a downstream air side of wall portion of the inside/outside air switching door to be moved independently with the inside/outside air switching door; and a first deodorizing filter for deodorizing a malodorous particle in air. The first deodorizing filter is supported by the filter support member to be moved integrally with the filter support member. When it is necessary to deodorize outside air introduced from the outside air intake port when the wall portion of the inside/outside air switching door opens the outside air intake port and closes the inside air intake port, the filter support member is controlled to move at a side of the outside air intake port in such a manner that outside air introduced from the outside air intake port passes through the first deodorizing filter. Thus, outside air flows uniformly through the first deodorizing filter, and an outside air intake noise is effectively adsorbed and reduced by the first deodorizing filter. On the other hand, when the deodorization is not necessary, the filter support member is moved at the downstream air side of the wall portion of the inside/outside air switching door so that outside air does not passes through the first deodorizing filter. Therefore, it can prevent an air amount to be blown into the passenger compartment from being decreased by the high pressure loss of the first deodorizing filter.

Further, when it is necessary to deodorize inside air introduced from the inside air intake port when the wall portion of the inside/outside air switching door opens the inside air intake port and closes the outside air intake port, the filter support member is controlled to move at a side of the inside air intake port in such a manner that inside air introduced from the inside air intake port passes through the first deodorizing filter. Thus, inside air flows uniformly through the first deodorizing filter, and an inside air intake noise is effectively adsorbed and reduced by the first deodorizing filter. On the other hand, when the deodorization is not necessary, the filter support member is moved at the downstream air side of the wall portion of the inside/outside air switching door so that inside air does not passes through the first deodorizing filter. Therefore, it can prevent an air amount to be blown into the passenger compartment from being decreased by the high pressure loss of the first deodorizing filter.

According to a third aspect of the present invention, an inside/outside air switching door is moved to set an inside/outside air mode in which both of an outside air intake port and an inside air intake port are opened, and a deodorizing filter is disposed in such a manner that only outside air introduced from the outside air intake port passes through the deodorizing filter in the inside/outside air mode. Further, the outside air intake port includes a first outside air intake portion and a second outside air intake portion, and the deodorizing filter is disposed in the first outside air intake portion to deodorize outside air flowing through the first outside air intake portion. Therefore, in the inside/outside air mode, only a small amount of clean outside air is introduced as compared with an amount of inside air. Thus, there is not cause a problem in that the amount of air to be blown into the passenger compartment is decreased while performing ventilation in the passenger compartment, and it is not necessary to improve air blowing capacity of a blow unit. Furthermore, the service life of the first deodorizing filter is effectively prolonged.

BRIEF DESCRIPTION OF THE DRAWINGS

Additional objects and advantages of the present invention will be more readily apparent from the following detailed description of preferred embodiments when taken together with the accompanying drawings, in which:

FIG. 18 is a schematic sectional view of an air conditioning apparatus according to a fourth preferred embodiment of the present invention;

DETAILED DESCRIPTION OF THE PREFERRED EMBODIMENTS

Figure 1:
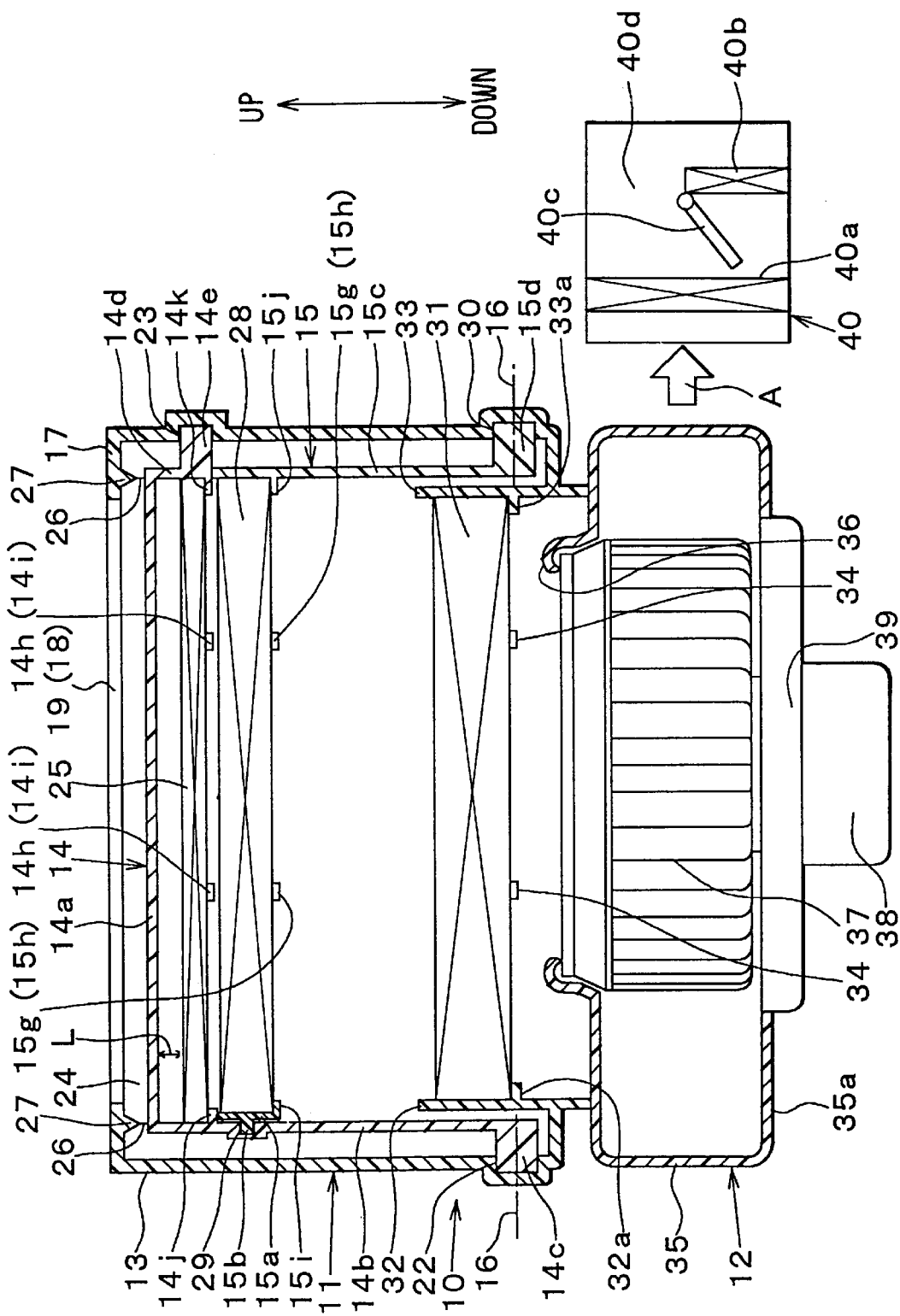
FIG. 1 is a longitudinal sectional view showing an air conditioning apparatus for a vehicle according to a first preferred embodiment of the present invention.

Preferring to the drawings, preferred embodiments of the present invention will now be described with reference to the accompanying drawings.

A first preferred embodiment of the present invention will be now described with reference to FIGS. 1 through 10.

A blower unit 10 is located under an instrument panel at a front side in the passenger compartment to face the front passenger's seat next to a driver's seat. In the blower unit 10 mounted on a vehicle, an inside/outside air switching device 11 is positioned above a blower 12. The two components 11 and 12 integrally constitute a single unit.

The inside/outside air switching device 11 includes an inside/outside air switching box 13 made of resin. An arc-shaped circumferential wall 17 (see FIG. 2) is formed at an upper portion of the inside/outside air switching box 13. The circumferential wall 17 forms part of a circular arc with its center located on an axis 16 around which a rotary door 14 and a filter support member 15 are rotated. An outside air intake port 18 through which outside air is introduced is opened at the vehicle front side of the circumferential wall 17, and an inside air intake port 19 through which inside air is introduced is opened at the vehicle rear side (i.e., passenger side) of the circumferential wall 17.

In a side wall on the vehicle front side of the inside/outside air switching box 13, there is opened an auxiliary inside air intake port 20 whose opening area is sufficiently smaller than that of the inside air intake port 19. The auxiliary inside air intake port 20 is opened and closed by an auxiliary inside air door 21. The auxiliary inside air door 21 is made of a flat plate which can be rotated around a rotating shaft 21a.

The rotary door 14 and the filter support member 15 which are key components of the first embodiment of the present invention are each formed integrally with plastic resin. The rotary door 14 constitutes an inside/outside air switching door having an arc-shaped circumferential wall 14a around the rotating center 16. The circumferential wall 14a is located radially inside the arc-shaped circumferential wall 17 and has a surface area greater than the opening area of the outside air intake port 18 and the opening area of the inside air intake port 19. Thus, in the first embodiment, the circumferential wall 14a forms a wall portion for opening and closing the outside air intake port 18 and the inside air intake port 19.

Figure 2:
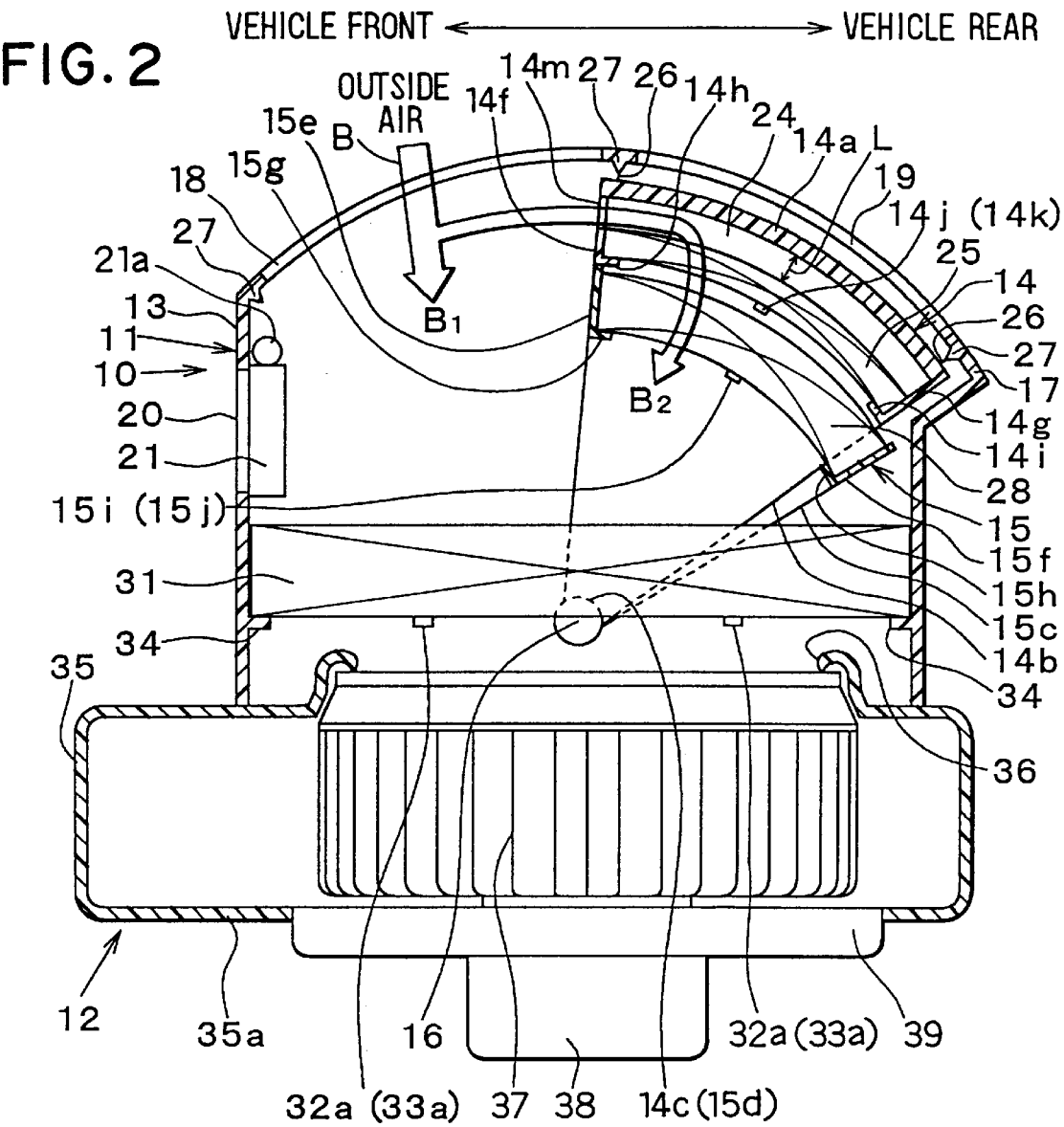
FIG. 2 is a longitudinal sectional view showing an inside/outside air switching device having deodorizing filters in a whole outside air mode according to the first embodiment.

The rotary door 14 has a side plate 14b on one side in its axial direction (i.e., leftmost position in FIG. 1). As shown in FIG. 2, the side plate 14b is formed in a fan shape, and extends downward and radially inside the circumferential wall 14a. In the pivotal center of the fan shaped side plate 14b, a cylindrical rotating shaft 14c having the rotating center 16 is integrally formed so as to extend outward in the axial direction. The rotating shaft 14c is movably inserted into and rotatably supported by a bearing hole 22 provided in a left side wall of the inside/outside air switching box 13 in a left-right direction of the vehicle.

An arc-shaped side plate 14d that slightly extends downward and radially inside the circumferential wall 14a is formed at the other side (right side in FIG. 1) of the rotary door 14 in the axial direction. A cylindrical support shaft 14e extending outward in the axial direction is formed integrally with the arc-shaped side plate 14d. The support shaft 14e is movably inserted into and rotatably supported by an arc-shaped bearing groove 23 provided in the right side wall of the inside/outside air switching box 13 in the left-right direction of the vehicle. An angle of circumference of the arc-shaped bearing groove 23 determines the maximum rotatable range (i.e., rotating angle) of the rotary door 14.

A first deodorizing filter 25 is disposed radially inside the circumferential wall 14a of the rotary door 14 to form a gap 24 having a predetermined distance L therebetween. As shown in FIG. 2, the first deodorizing filter 25 is arranged in a circular arc shape along the circumferential wall 14a. The filter 25 installed radially inside the circumferential wall 14a of the rotary door 14 is supported by the following supporting members.

As shown in FIG. 2, support plates 14f and 14g extending downward and radially inside the circumferential wall 14a are formed at both ends in the circumferential direction of the circumferential wall 14a of the rotary door 14. Each of the support plates 14f and 14g has a rectangular shape and is prolonged in the axial direction of the rotary door 14. The side plates 14b and 14d at both ends in the axial direction are integrally coupled by the support plates 14f and 14g. The support plates 14f and 14g have projections 14h and 14i respectively supporting the bottom of the first deodorizing filter 25. The side plates 14b and 14d also respectively have projections 14j and 14k at both ends in the axial direction of the rotary door 14, and the projections 14j and 14k also support the bottom of the first deodorizing filter 25.

The first deodorizing filter 25 is disposed on and supported by the projections 14h through 14k mentioned above, and is located removably and radially inside the circumferential wall 14a of the rotary door 14. An opening 14m is provided in the support plate 14f to introduce outside air from the outside air intake port 18 into the gap 24 provided radially inside the circumferential wall 14a.

A sealing member 26 made of elastic material such as rubber is fixedly attached using adhesives to the outer surface of the circumferential wall 14a. The sealing member 26 has a rectangular frame corresponding to the opening edges of the outside air intake port 18 and inside air intake port 19. On the other hand, the arc-shaped circumferential wall 17 of the inside/outside air switching box 13 has integrally formed projection ribs 27 each having a triangular cross-section and projecting radially inside along the opening edges of the outside air intake port 18 and inside air intake port 19.

The projection ribs 27 and sealing member 26 are pressed together to close hermetically the outside air intake port 18 or the inside air intake port 19 by the arc-shaped circumferential wall 17. Therefore, it prevents inside air from being mixed into outside air or outside air from being mixed into inside air.

The filter support member 15 is located radially inside the first deodorizing filter 25 which in turn are positioned radially inside the circumferential wall 17 of the rotary door 14. The filter support member 15 incorporates a second deodorizing filter 28. Because the filter support member 15 does not act to perform inside/outside air switching operation, the filter support member 15 has no a circumferential wall corresponding to the above-described circumferential wall 14a.

At one axial end of the filter support member 15, a side plate 15a provided radially inside the first deodorizing filter 25 is formed. The side plate 15a is formed in a circular shape, and slightly extends downward and radially inside the first deodorizing filter 25. A cylindrical support shaft 15b extending axially outward is integrally attached to the circular side plate 15a. The support shaft 15b is movably inserted into and slidably supported by a circular bearing groove 29 provided in the fan-shaped side plate 14b of the rotary door 14. An angle of circumference of the circular bearing groove 29 determines the maximum rotatable range (i.e., rotating angle) of the filter support member 15.

At the other axial end of the filter support member 15, a side plate 15c is formed. As shown in FIG. 2, the side plate 15c is formed in a fan shape, and extends downward and radially inside the support shaft 14e of the rotary door 14. In the pivotal center of the fan-shaped side plate 15c, a cylindrical rotating shaft 15d having the rotating center 16 is integrally formed to extend axially outward. The rotating shaft 15d is movably inserted into and rotatably supported by a bearing hole 30 provided in a right side wall of the inside/outside air switching box 13 in the left-right direction of the vehicle.

The second deodorizing filter 28 contained in the filter support member 15 are supported by the following supporting members. Support plates 15e and 15f extending downward and radially inside the support plates 14f and 14g of the rotary door 14 are formed at both circumferential ends of the side plates 15a and 15c of the filter support member 15. Each of the support plates 15e and 15f has a rectangular shape, and is prolonged in the axial direction of the filter support member 15. The two support plates 15e and 15f integrally connect the side plates 15a and 15c at both axial ends.

The support plates 15e and 15c respectively have projections 15g and 15h supporting the bottom of the second deodorizing filter 28. Further, projections 15i and 15j supporting the bottom of the second deodorizing filter 28 are also provided on the side plates 15a and 15c at both axial ends of the filter support member 15.

The second deodorizing filter 28 is disposed on and supported by the projections 15g through 15j so that the second deodorizing filter 28 is incorporated removably within the filter support member 15.

The first and second deodorizing filters 25 and 28 are constituted by the same material. That is, each of the first and second deodorizing filters 25 and 28 is made in such a manner that deodorizers (e.g., active carbon) is impregnated in a porous base material such as urethane foam by suitable binders. Therefore, the first and second deodorizing filters 25 and 28 adsorb malodorous particles in air (e.g., diesel exhaust gas particles such as acetaldehyde). The deodorizer-impregnated porous base material is made into a corrugated form (i.e., wave shape) to increase the filter surface area. The edge portions of the porous filter base material are supported by a frame made of resin.

Because of the presence of deodorizers such as active carbon, an air flow resistance (i.e., pressure loss) in the first and second deodorizing filters 25 and 28 becomes greater than that in a dust filter 31. In the inside/outside air switching box 13, as shown in FIGS. 1 and 2, the dust filter 31 is located near the rotating shafts 14c and 15d of the rotary door 14 and filter support member 15, i.e., the dust filter 31 is disposed at an outlet side of the inside/outside air switching box 13.

At the outlet side of the inside/outside air switching box 13, filter support walls 32 and 33 are integrally formed. The filter support wall 32 is provided axially inside the fan-shaped side plate 14b of the rotary door 14, and the filter support wall 33 is provided axially inside the fan-shaped side plate 15c of the filter support member 15. The dust filter 31 has a rectangular shape, and is inserted between the two filter support walls 32 and 33 in the left-right direction of the vehicle and the two side walls of the inside/outside air switching box 13 in a front-rear direction of the vehicle. Projections 32a, 33a and 34 for supporting bottom portions of the dust filter 31 are respectively formed on the filter support walls 32 and 33 as well as on the two side walls of the inside/outside air switching box 13 in the front-rear direction of the vehicle.

The dust filter 31 is disposed onto the projections 32a, 33a and 34 so that the dust filter 31 is located removably near the rotating shafts 14c and 15d within the inside/outside air switching box 13 (i.e., at the outlet side of the box 13 and at an immediately upstream position of a blower intake port described later). The dust filter 31 is provided to remove dust from the inside air or outside air introduced into the inside/outside air switching box 13. Illustratively, the dust filter 31 is constituted by a filter medium such as porous urethane foam that is made into corrugated form to acquire an increased filter area. The fringe portion of the filter medium in this corrugated form is supported by a frame illustratively made of resin.

The dust filter 31 is made of a simple filter medium free of deodorizers. Therefore, in the dust filter 31, the air flow resistance (pressure losses) is greatly decreased as compared with the first and second deodorizing filters 25 and 28.

The blower 12 is a centrifugal multiblade blower that includes a well-known scroll type casing 35 made of plastic resin. At a top center portion of the casing 35, a bell-mouth type intake port 36 is opened. The casing 35 incorporates a centrifugal multiblade fan (i.e., sirocco fan) 37 that blows air sucked from the intake port 36.

The fan 37 is positioned so that its rotating shaft is oriented in the up-down direction of the vehicle. The blown air is turned by 90 degrees in its direction when passing through the fan 37, and is sent radially outward of the fan 37. In the first embodiment, an air outlet port (not shown) of the casing 35 is set in a right direction of the vehicle in FIG. 1. That is, from the air outlet port of the casing 35, the blown air flows in a direction shown by arrow A in FIG. 1.

A motor 38 rotating the fan 37 is positioned so as to penetrate through a bottom portion 35a of the casing 35. The motor 38 is fastened to a bottom portion 35a of the casing 35 by means of a mounting flange 39 attached to the motor 38.

The air outlet port of the casing 35 is connected to an air intake port of an air conditioning unit 40. The air conditioning unit 40 includes a refrigerant evaporator (i.e., cooling heat exchanger) 40a, a hot water type heater core (i.e., heating heat exchanger) 40b, a temperature regulating air mixing door (i.e., temperature regulating means) 40c, a bypass passage 40d of the heater core 40b, an air outlet mode switching door mechanism (not shown), and air outlets (not shown) such as a face outlet, a defroster outlet and a foot outlet.

Figure 3:
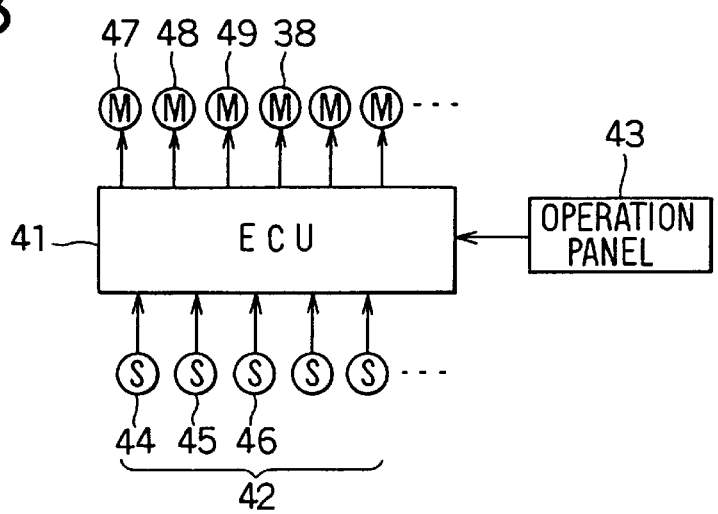
FIG. 3 is an electrical control block diagram of the air conditioning apparatus according to the first embodiment.

FIG. 3 is an electrical control block diagram of the first embodiment. In FIG. 3, an electronic control unit (ECU) 41 for air conditioning is constituted illustratively by a microcomputer. Running predetermined programs, the ECU 41 controls the air conditioning components of the blower unit 10 and air conditioning unit 40 accordingly. The ECU 41 is powered from batteries (not shown) when an ignition switch (not shown) is turned on to start an engine of the vehicle.

The ECU 41 receives sensor signals from a well known sensor group 42 and from an air conditioning operation panel 43 provided in the instrument panel within the passenger compartment of the vehicle. The sensor group 42 related to an electrical control of the first embodiment includes an outside air temperature sensor 44 for detecting the temperature outside the vehicle (i.e., outside air temperature), an outside air odor sensor 45 for detecting malodorous particles outside the vehicle (e.g., diesel exhaust fumes), and an inside air odor sensor 46 for detecting smelly molecules within the passenger compartment of the vehicle (e.g., cigarette smoke).

The air conditioning components controlled by the ECU 41 include a servo motor 47 for controlling a rotating amount of the rotary door 14, a servo motor 48 for controlling a rotating amount of the filter support member 15, and a servo motor 49 for controlling a rotating amount of the auxiliary inside air door 21. Output shafts of the servo motors 47 through 49 are connected via suitable linkage to the rotating shaft 14c of the rotary door 14, to the rotating shaft 15d of the filter support member 15, and to the rotating shaft 21a of the auxiliary inside air door 21, respectively. That is, the first embodiment has the servo motors 47 through 49 acting independently as actuators for the three rotating members 14, 15 and 21 of the inside/outside air switching device 11.

Figure 4:
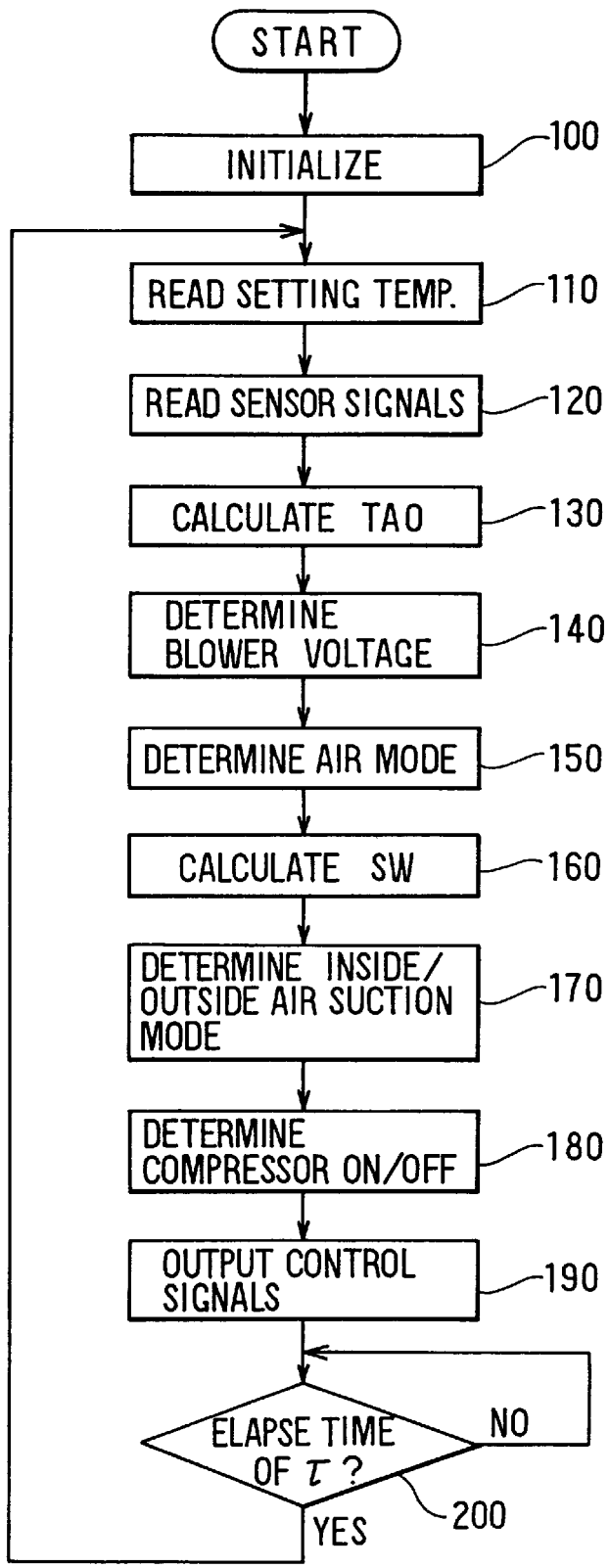
FIG. 4 is a flowchart of an electrical control of the air conditioning apparatus according to the first embodiment.

Next, an operation of the air conditioning apparatus will be now described with reference to FIGS. 4 and 5. When the ignition switch is turned on so that an electric power is supplied to the ECU 41, an air conditioning operation switch (not shown) on the air conditioning operation panel 43 is turned on to start a control routine shown in FIG. 4. In step 100, each component is initialized. In step 110, a set temperature set by a temperature setting switch of the air conditioning control panel 43 is input.

In step 120, signals from the sensor group 42 having been converted from analog to digital form are read. In step 130, a target temperature (TAO) of air blown into the passenger compartment is computed by use of expression (1) stored in a ROM beforehand.

$$TAO = Kset \times Tset - Kr \times Tr - Kam \times Tam - Ks \times Ts + C \quad (1)$$

where, Tset is the temperature set by the temperature setting switch, Tr is the detected value from the inside air temperature sensor, Tam is the detected value from the outside air temperature sensor 44, Ts is the detected value from a sunlight amount sensor; Kset, Kr, Kam and Ks are gains; and C is a correction coefficient.

In step 140, a voltage to be applied to the blower motor (blower voltage) 38 in accordance with the TAO is computed by use of a map (not shown) stored in the ROM beforehand. In step 150, an air mode (i.e., air outlet mode) corresponding to the TAO is determined by use of a map (not shown) stored in the ROM beforehand. In the step 150, a face mode is selected when the computed TAO is on the lowest level; as the TAO becomes higher, a bi-level mode, a foot mode, or a foot defroster mode is selected progressively in that order.

In the first embodiment, when a defroster switch (not shown) provided on the operation panel 43 is operated, the defroster mode is forcibly set. In step 160, a target opening degree (SW) of the temperature regulating air mixing door 40c in the air conditioning unit 40 is computed by use of expression (2) stored in the ROM beforehand.

$$S = ((TAO - Te)/(Tw - Te)) \times 100 \ (\%) \quad (2)$$

where, Te is the detected value from a post evaporator temperature sensor for detecting a temperature of air blown from the evaporator 40a, and Tw is the detected value from a water temperature sensor for detecting a temperature of hot water circulating in the hot water heater core 40b. If the computation above finds that SW≦0 (%), the air mixing door 40c is controlled at a position so that all air from the refrigerant evaporator 40a passes through the bypass air passage 40d. If it is found that SW≧100 (%), the air mixing door 40c is controlled at a position so that all air passes through the heater core 40b. If it is found that 0 (%)<SW<100 (%), the air mixing door 40c is controlled at a position so that air passes through both the heater core 40b and the bypass air passage 40d.

In step 170, an inside/outside air intake mode (i.e., inside/outside air suction mode) is selected by the inside/outside air switching device 11. How the mode is determined in the step 170 will be described later in more detail with reference to FIG. 5. In step 180, it is determined that a compressor (not shown) in a refrigeration cycle including the evaporator 40a is turned ON or OFF based on the detected value Tam from the outside air temperature sensor 44 and the detected value Te from the post evaporator temperature sensor.

In step 190, control signals are output to the relevant components such as the servo motors 47 and 48 as well as the ventilating motor 38 so that the modes and settings determined in the steps 140 through 180 will be established and implemented. In step 200, it is determined that a control cycle time of τ elapses. When the control cycle time of τ elapses in the step 200, the program returns to the step 110.

How the inside/outside air intake mode is determined in the step 170 will now be described in detail with reference to FIG. 5. In step 170a, an inside/outside air mode is determined provisionally under control of a map stored in the ROM beforehand. Specifically, when the target temperature (TAO) of air blown into the passenger compartment is equal to or lower than a predetermined value X (in a very low temperature zone), an inside air mode is selected; when the temperature TAO is greater than the predetermined value X, an outside air mode is selected.

In step 170b, a check is performed if the inside/outside air mode was selected in step 170a. When the outside air mode is determined in the step 170b, it is determined whether or not deodorization is necessary in step 170c. That is, the detected value detected by the outside air odor sensor 45 is compared with a predetermined odor setting value. In the step 170c, when the detected value detected by the outside air odor sensor 45 is larger than the predetermined odor setting value, for example, the vehicle being trapped in a traffic jam in the city, it is determined that the deodorization is necessary and step 170d is reached.

In the step 170d, it is determined that the outside air temperature detected by the outside air temperature sensor 44 has dropped below a set value (e.g., −5 ° C., in the first embodiment). The set value of the outside air temperature in the step 170d represents a temperature at which the compressor (not shown) circulating refrigerant through the refrigerant evaporator 40a is forcibly stopped. Thus, in the step 170d, it can be determined that the outside air temperature is in a compressor stopping zone.

When the outside air temperature has dropped below the set value, the compressor stops its operation to stop refrigerating and dehumidifying actions of the refrigerant evaporator 40a. In such a case, if the inside air mode is set, inside air having a high humidity within the passenger compartment clouds up the windshield of the vehicle; and therefore, a driver's maneuvering ability is affected. Thus, when the outside air temperature is below the set value in the step 170d, the whole outside air mode is always selected in step 170e to prevent the windshield of the vehicle from defrosting or defogging. In the whole outside air mode set in the step 170e, the deodorization mode is supplemented. That is, in the step 170e, the whole outside air and the deodorization mode are performed.

The whole outside air mode and the deodorization mode determined in the step 170e will now be described in more detail with reference to FIG. 6. In the inside/outside air switching device 11, the rotary door 14, the filter support member 15 and the auxiliary inside air door 21 are rotated by the servo motors 47, 48 and 49 respectively to the positions shown in FIG. 6. More specifically, the rotary door 14 is rotated clockwise in FIG. 6, so that the circumferential wall 14a is positioned to close the inside air intake port 19 and to fully open the outside air intake port 18. In this case, the sealing member 26 on the outer surface of the circumferential wall 14a and the ribs 27 projecting toward the arc-shaped circumferential wall 17 of the inside/outside air switching box 13 are pushed together to close the inside air intake port 19 hermetically. Thus, it prevents the mixing of inside air into outside air.

Figure 6:
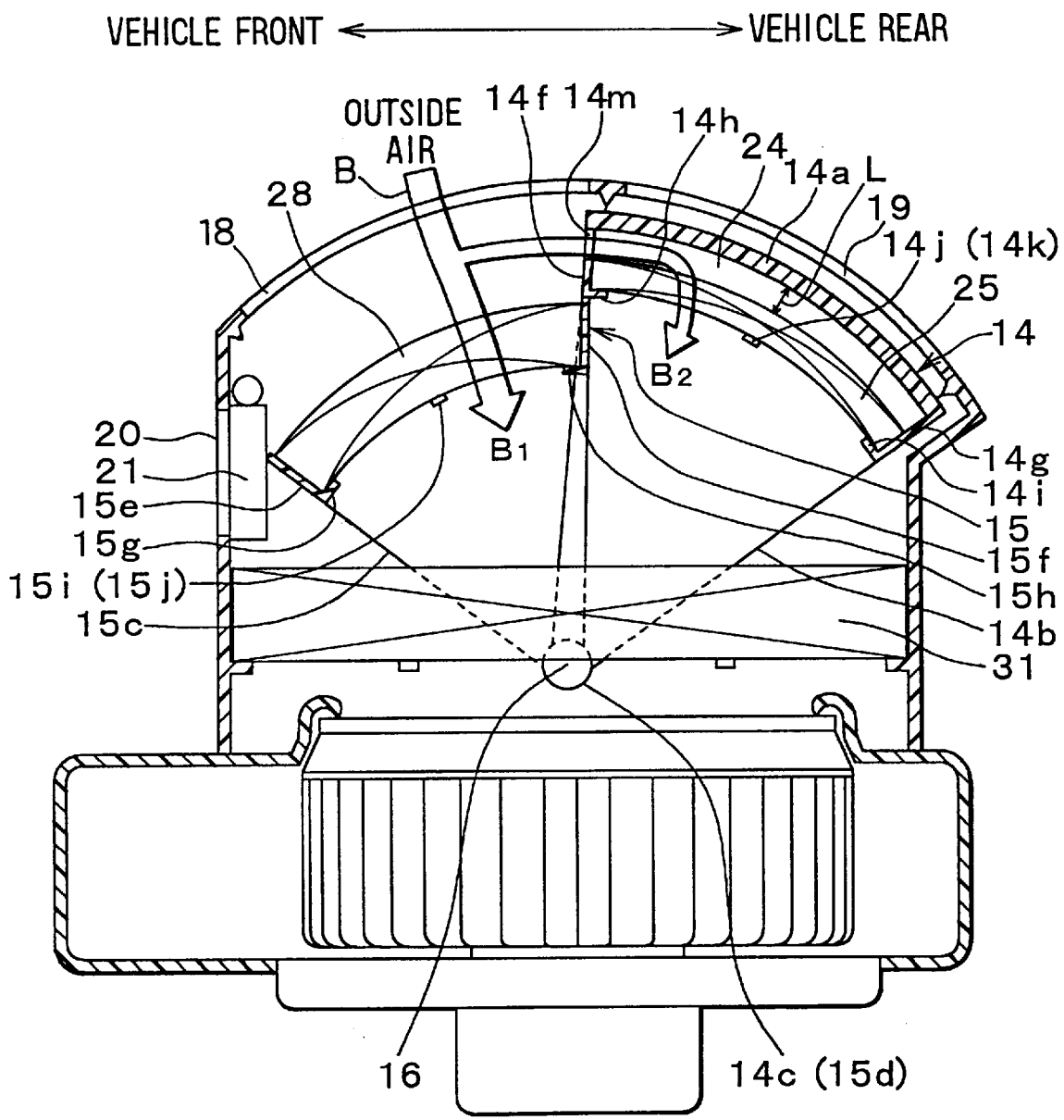
FIG. 6 is a longitudinal sectional view showing the inside/outside air switching device having the deodorizing filters in the whole outside air mode and a deodorization mode according to the first embodiment.

On the other hand, the filter support member 15 is rotated counterclockwise in FIG. 6 and positioned radially inside the outside air intake port 18. The auxiliary inside air door 21 is rotated to a position to fully close the auxiliary inside air intake port 20. Because the filter support member 15 is disposed radially inside the outside air intake port 18, most ($B_1$) of the outside air (B) from the outside air intake port 18 passes through the second deodorizing filter 28 mounted on the filter support member 15. The second deodorizing filter 28 adsorbs malodorous particles (diesel exhaust fumes, etc.) in the outside air. At the same time, the second deodorizing filter 28 removes dust from the outside air ($B_1$).

The gap 24 is formed between the radially inner surface of the circumferential wall 14a of the rotary door 14 and the radially outer surface of the first deodorizing filter 25. Further, the gap 24 is communicated with the outside air intake port 18 through the opening portion 14m in the left side support plate 14f. Therefore, a part (B2) of the outside air (e.g., 20% of total air flow) from the outside air intake port 18 is introduced into the gap 24. The outside air (B2) introduced into the gap 24 passes through the first deodorizing filter 25 within the rotary door 14 to perform the deodorization and dust removal.

The outside air having passed through the deodorizing filters 25 and 28 flows into the outlet side of the inside/outside air switching box 13 and passes through the dust filter 31. Thereafter, the air flows into the casing 35 through the intake port 36 of the blower 12 and is blown out by the fan 37. The blown air flows out of the air outlet of the casing 35 and flows into the air conditioning unit 40. In the air conditioning unit 40, the temperature of air is adjusted by adjusting an amount of air passing through the evaporator 40a and an amount of air passing through the heater core 40b, and the conditioned air is blown into the passenger compartment from an air outlet.

In the whole outside air mode and the deodorization mode shown in FIG. 6, the filter support member 15 including the second deodorizing filter 28 is rotated to a position different from that of the rotary door 14 so that the second deodorizing filter 28 is faced directly with the outside air intake port 18. Therefore, a front area of the second deodorizing filter 28 relative to the flow of the outside air ($B_1$) becomes large, and the outside air ($B_1$) flows uniformly throughout the second deodorizing filter 28.

Because malodorous particles within the outside air are adsorbed in a relatively uniform manner by the entire surface of the second deodorizing filter 28, the second deodorizing filter 28 has a longer service life and are more efficient in deodorization than before. Because the rotary door 14 has a hard plate surface made of resin, the noise from the outside air intake port is reflected by the door plate surface and may reach the passenger compartment of the vehicle. In this case, the second deodorizing filter 28 are constituted by a porous base material carrying adsorbents. Therefore, the noise adsorption performance of the second deodorizing filter 18 is greatly increased as compared with the rotary door 14. Thus, with the second deodorizing filter 28 directly facing the outside air intake port 18, the outside air intake noise is effectively adsorbed and reduced by the second deodorizing filter 28.

Figure 5:
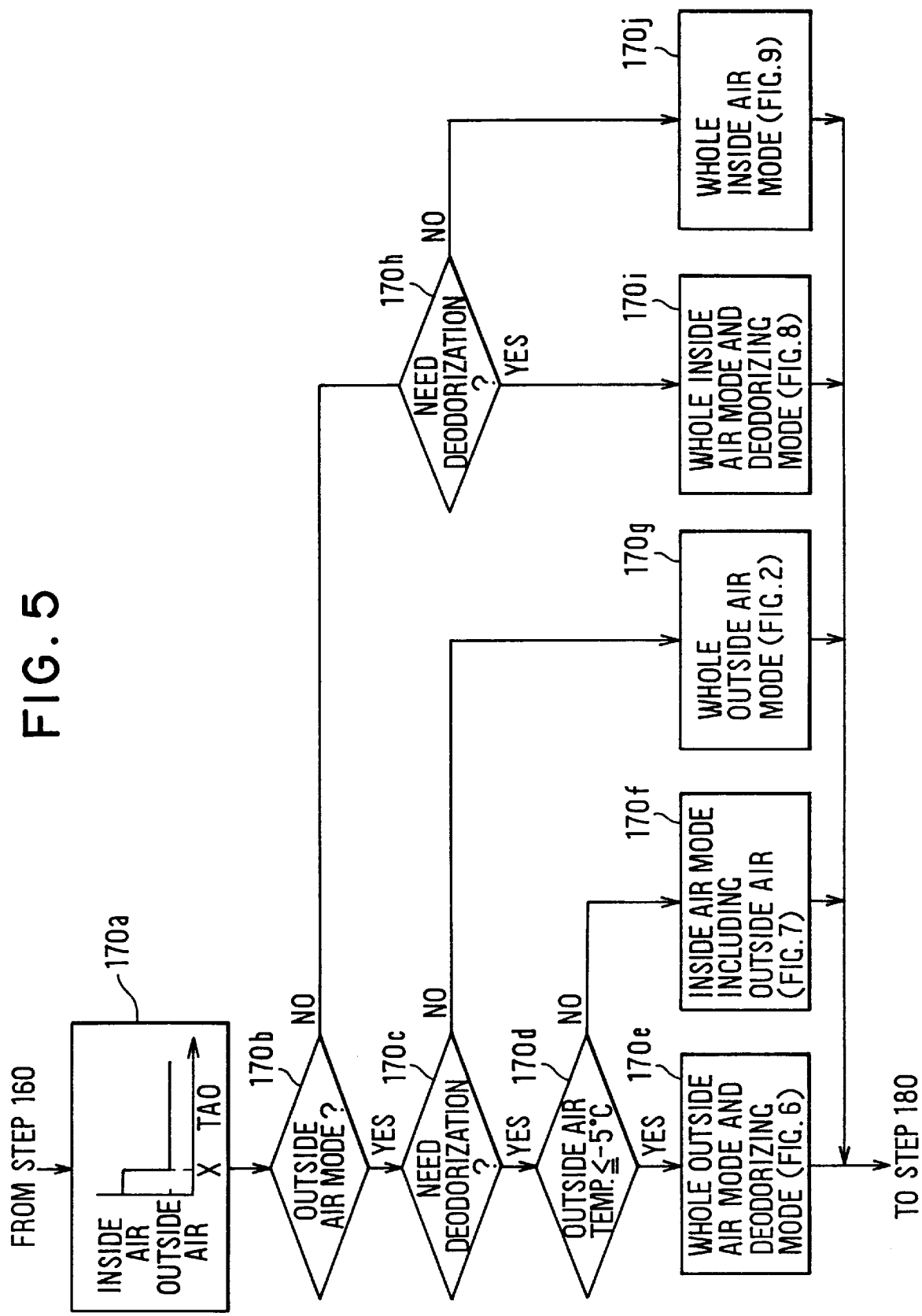
FIG. 5 is a detailed flowchart of subordinate process of the flowchart of FIG. 4.
Figure 7:
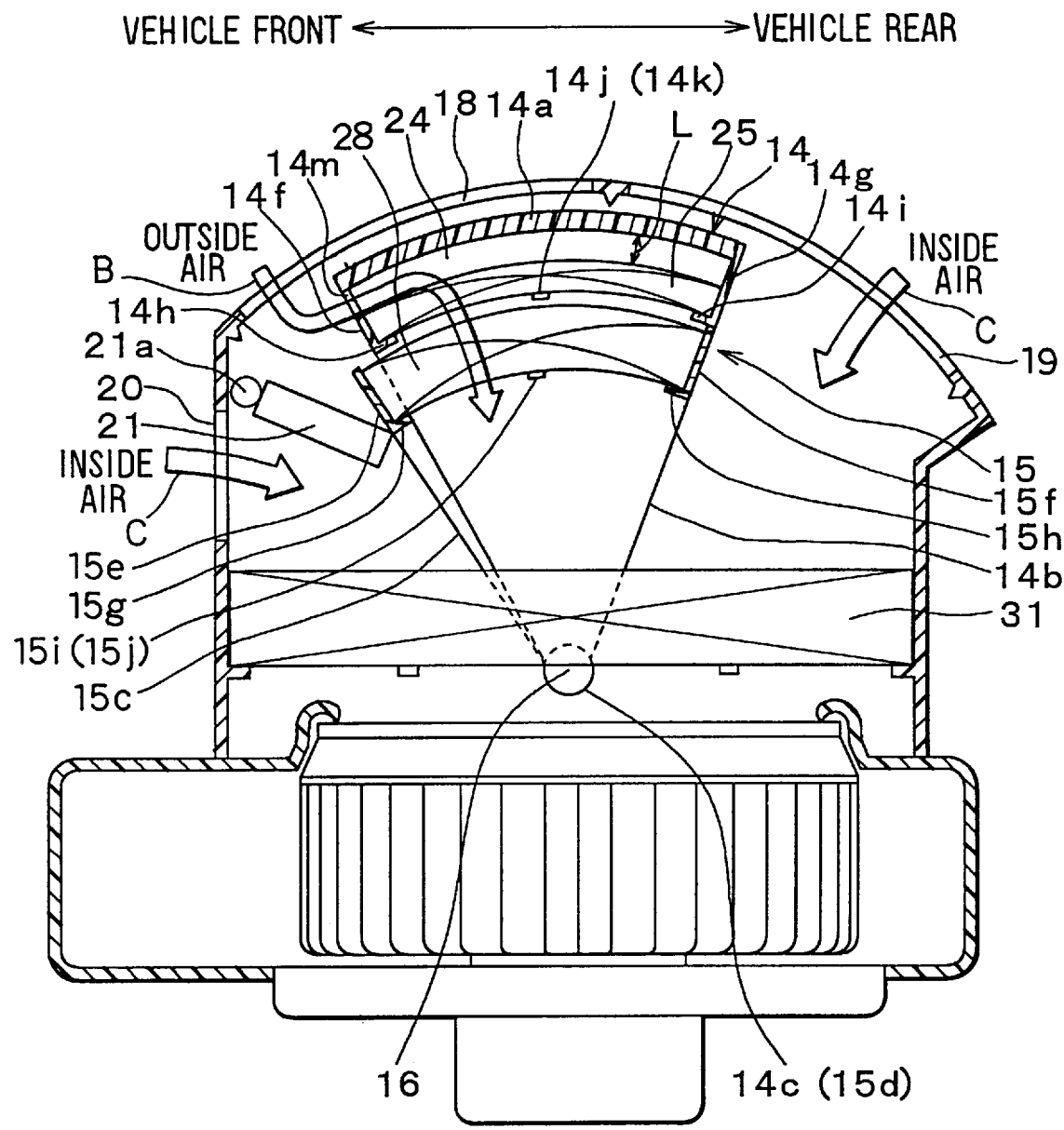
FIG. 7 is a longitudinal sectional view showing the inside/outside air switching device having the deodorizing filters in a partial outside air-mixed inside air mode according to the first embodiment.

In the step 170d of the flowchart in FIG. 5, when the outside air temperature is higher than the set value, a partial outside air-mixed inside air mode (with outside air deodorized) is set in step 170f as shown in FIG. 7. That is, an inside air mode including outside air is set while deodorizing outside air. FIG. 7 shows the partial outside air-mixed inside air mode set in the step 170f. In this mode as shown in FIG. 7, the rotary door 14 and filter support member 15 are integrally rotated (i.e., the filter support member 15 held inside the rotary door 14) counterclockwise by a predetermined angle from the position in FIG. 2. The rotary door 14 and the filter support member 15 are rotated at an intermediately opened position.

Further, the auxiliary inside air door 21 opens the auxiliary inside air intake port 20, and the tip of the auxiliary inside air door 21 contacts the support plate 15e of the filter support member 15. Because the auxiliary inside air door 21 is designed to have the same length as the support plate 15e in the axial direction of the filter support member 15, the tip of the auxiliary inside air door 21 contacts the entire axial length of the support plate 15e.

In the partial outside air-mixed inside air mode (with outside air deodorized) shown in FIG. 7, outside air is partially (e.g., 30% or less, about 15% to be more specific) mixed in the inside air. Therefore, the rotary door 14 and filter support member 15 are rotated to the intermediately opened position, i.e., the position where the inside air intake port 19 due to the circumferential wall 14a of the rotary door 14 is widely open while the outside air intake port 18 is limited in its opening.

When the rotary door 14 and filter support member 15 are integrally rotated to the above-described intermediately opened position, inside air C is introduced from the inside air intake port 19 and from the auxiliary inside air intake port 20 while a small amount of outside air B is introduced from the outside air intake port 18. The limited outside air B flows along the plate-shaped auxiliary inside air door 21 acting as a guide and flow into the opening 14m. From the opening 14m, the outside air B passes through the gap 24, and flows through the first deodorizing filter 25 in the rotary door 14 and the second deodorizing filter 28 in the filter support member 15 for deodorization.

On the other hand, the inside air intake port 19 and auxiliary inside air intake port 20 together provide a sufficiently large flow area for the inside air C. Therefore, it easy to secure the necessary quantity of inside air. The inside air C and the limited outside air B flows into the outlet side of the inside/outside air switching box 13 to pass through the dust filter 31. The dust filter 31 removes dust specifically from the inside air C. After passing through the dust filter 31, the mixed inside and outside air is blown out by the blower 12 into the air conditioning unit 40. The mixed air is adjusted in temperature, and is blown out toward the passenger compartment from an air outlet.

The partial outside air-mixed inside air mode is a mode where a part of the outside air is mixed in the inside air. Therefore, this mode is different from the whole inside air mode, and the passenger compartment can be ventilated using outside air introduced from the outside. This can suppress a rise of the $CO_2$ concentration in the passenger compartment. In a steady operation following the initial transient phase of heating or cooling operation, the partial outside air-mixed inside air mode can be maintained in a long time without raising the $CO_2$ concentration. Thus, the partial outside air-mixed inside air mode is one which may be utilized effectively during the steady operation.

In the partial outside air-mixed inside air mode, because the blown air contains a large amount of inside air being circulated, the thermal load for heating and cooling is reduced. During heating operation, the temperature of air to be blown into the passenger compartment can be rapidly increased. Further, during cooling operation, the power to drive the compressor may be lower than that in comparable conventional setups. Further, because the amount of outside air passing through the first and second deodorizing filters 25 and 28 is small, the rate of outside air flowing into the first and second deodorizing filters 25 and 28 is lowered and the pressure losses in the filters 25 and 28 are reduced correspondingly. In addition, because the amount of air passing through the first and second deodorizing filters 25 and 28 becomes small, a longer service life of these filters 25 and 28 can be provided.

When it is determined that the deodorization is not necessary in the step 170c (as in the case of the vehicle traveling in a low-pollution environment in the suburbs) shown in FIG. 5, the whole outside air mode without performing the deodorizing operation is set in step 170g in FIG. 5. FIG. 2 shows the whole outside air mode shown in the step 170g. In the whole outside air mode, the rotary door 14 and the filter support member 15 are integrally rotated clockwise to the rightmost position in FIG. 2. Therefore, the circumferential wall 14a of the rotary door 14 fully closes the inside air intake port 19 and fully opens the outside air intake port 18. The auxiliary inside air door 21 is actuated to fully close the auxiliary inside air intake port 20.

In the whole outside air mode shown in FIG. 2, the inside air intake ports 19 and 20 are completely closed, and only outside air B is introduced from the outside air intake port 18 into the inside/outside air switching box 13. The greater part ($B_1$) of the outside air (B) from the outside air intake port 18 passes directly through the dust filter 31 which removes dust from the outside air ($B_1$). A part ($B_2$) of the outside air (B) from the outside air intake port 18 is introduced into the gap 24 through the opening 14m. The outside air ($B_2$) from the gap 24 passes through the first and second deodorizing filters 25 and 28 for deodorization and dust removal.

Thereafter, the outside air ($B_2$) joins with the outside air $B_1$ before passing through the dust filter 31. The filtered outside air is blown out by the fan 37 of the blower 12. The temperature of blown air is adjusted in the air conditioning unit 40, and is blown out toward the passenger compartment.

In the ordinary whole outside air mode shown in FIG. 2, the greater part ($B_1$) of the outside air (B) from the outside air intake port 18 flows directly into the dust filter 31 without passing through the first and second deodorizing filters 25 and 28. Therefore, the pressure losses due to the deodorizing filters 25 and 28 having the high air flow resistance can be suppressed, and the amount of air can be readily increased. Thus, in the whole outside air mode, the air conditioning capability for the passenger compartment can be improved.

In the step 170a shown in FIG. 5, when the target temperature (TAO) of air to be blown into the passenger compartment is lower than the predetermined temperature X (i.e., TAO≦X), an inside air mode is set. In the inside air mode, the determination in the step 170b becomes "NO" and step 170h is performed. In the step 170h, it is determined whether or not the deodorization is necessary in the inside air mode. Specifically, the detected value detected by the inside air odor sensor 46 is compared with a predetermined set value. When the detected value detected by the inside air odor sensor 46 is larger than the predetermined set value, as in the case of the passenger compartment being filled with cigarette smoke, the deodorization is necessary and whole inside air mode and deodorization mode are performed in step 170i.

Figure 8:
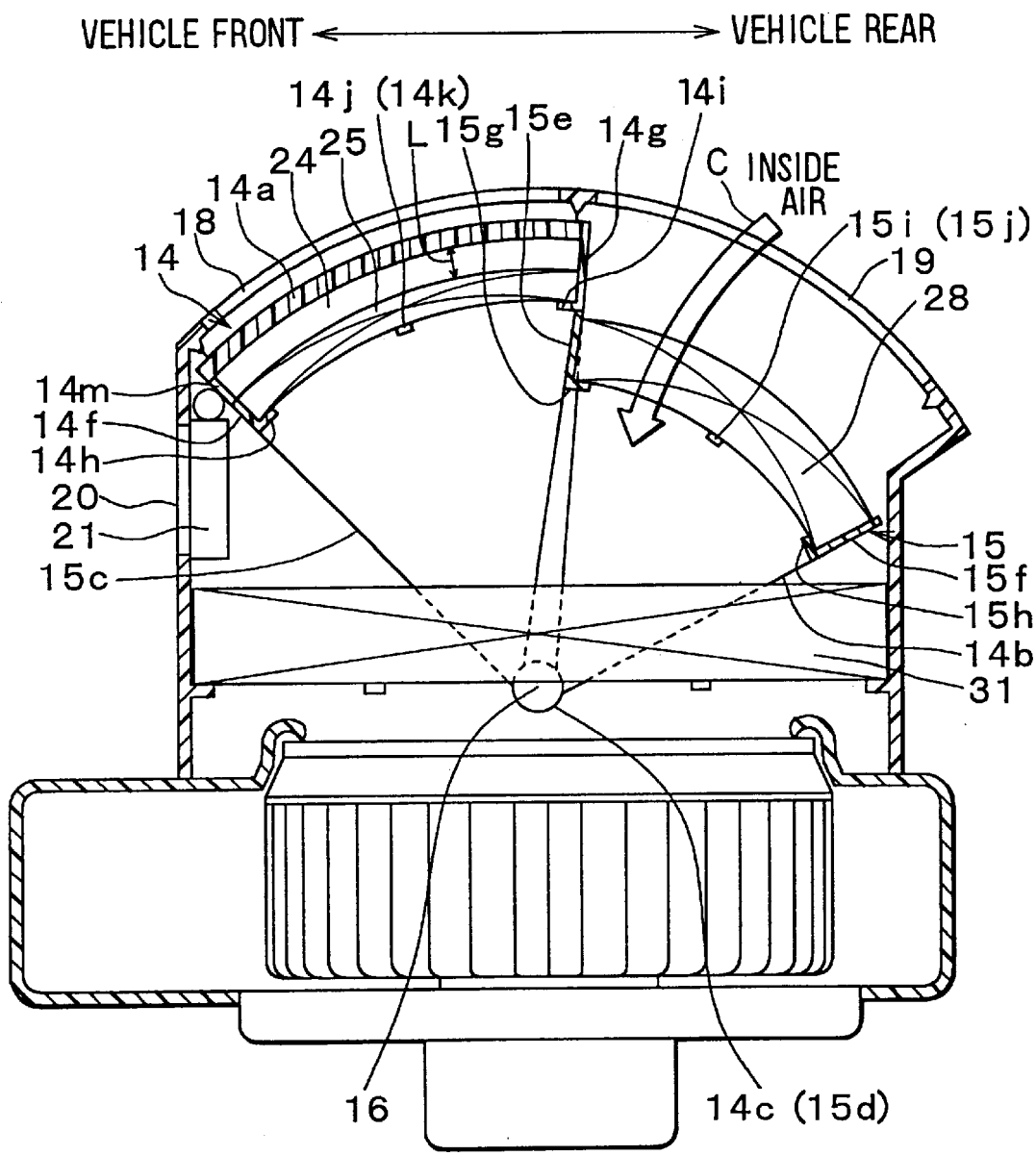
FIG. 8 is a longitudinal sectional view showing the inside/outside air switching device having the deodorizing filters in a whole inside air mode and the deodorization mode according to the first embodiment.

In the step 170i, the whole inside air mode and the deodorization mode are set as shown in FIG. 8. How the mode in the step 170i is set will be described below with reference to FIG. 8. The rotary door 14 of the inside/outside air switching device 11 is rotated counterclockwise to the leftmost position in FIG. 8. Therefore, the circumferential wall 14a closes the outside air intake port 18 and fully opens the inside air intake port 19. The outside air intake port 18 is completely shut off by the circumferential wall 14a.

On the other hand, the filter support member 15 is rotated clockwise to the rightmost position radially inside the inside air intake port 19 in FIG. 8. The auxiliary inside air door 21 is rotated to a position to fully close the auxiliary inside air intake port 20. Because the filter support member 15 is positioned radially inside the inside air intake port 19, all inside air C from the inside air intake port 18 passes through the second deodorizing filter 28 of the filter support member 15. Therefore, the second deodorizing filter 28 adsorbs malodorous particles (e.g., cigarette smoke) in the inside air within the passenger compartment. At the same time, the second deodorizing filter 28 remove dust from the inside air C.

After passing through the second deodorizing filter 28, the inside air C flows through the dust filter 31, and is blown out by the fan 37 of the blower 12 into the air conditioning unit 40. The temperature of the blown air is adjusted in the air conditioning unit 40, and the conditioned air is further blown toward the passenger compartment.

In the whole inside air mode and the deodorization mode shown in FIG. 8, the filter support member 15 containing the second deodorizing filter 28 is rotated to a position different from that of the rotary door 14 so that the second deodorizing filter 28 is faced directly with the inside air intake port 19. Therefore, a front area of the second deodorizing filter 28 facing the flow of the inside air C becomes large, and the inside air C flows uniformly throughout the second deodorizing filter 28.

For the same reasons as in the whole outside air mode and the deodorizing mode shown in FIG. 6, the second deodorizing filter 28 has a longer service life and is more efficient in deodorization than before, and the inside air intake noise is effectively adsorbed and reduced by the second deodorizing filter 28.

Next, when the odor level in the passenger compartment is low, it is determined that the deodorization is not necessary in step 170h. In this case, the whole inside air mode without performing the deodorization is set in step 170j shown in FIG. 5. In the whole inside air mode shown in FIG. 9, the rotary door 14 and the filter support member 15 are integrally rotated counterclockwise to the leftmost position. Therefore, the circumferential wall 14a of the rotary door 14 fully closes the outside air intake port 18 and fully opens the inside air intake port 19. The auxiliary inside air door 21 is actuated to open the auxiliary inside air intake port 20.

Thus, the outside air intake port 18 is completely shut off by the circumferential wall 14a, and only inside air C is introduced into the inside/outside air switching box 13 from the inside air intake ports 19 and 20. The inside air C from both the inside air intake port 19 and the auxiliary inside air intake port 20 goes directly to the dust filter 31. The dust filter 31 removes dust from the inside air C. After passing through the dust filter 31, the inside air is blown by the fan 37 of the blower 12. The temperature of the blown air is adjusted in the air conditioning unit 40, and the conditioned air is blown out toward the passenger compartment.

Figure 9:
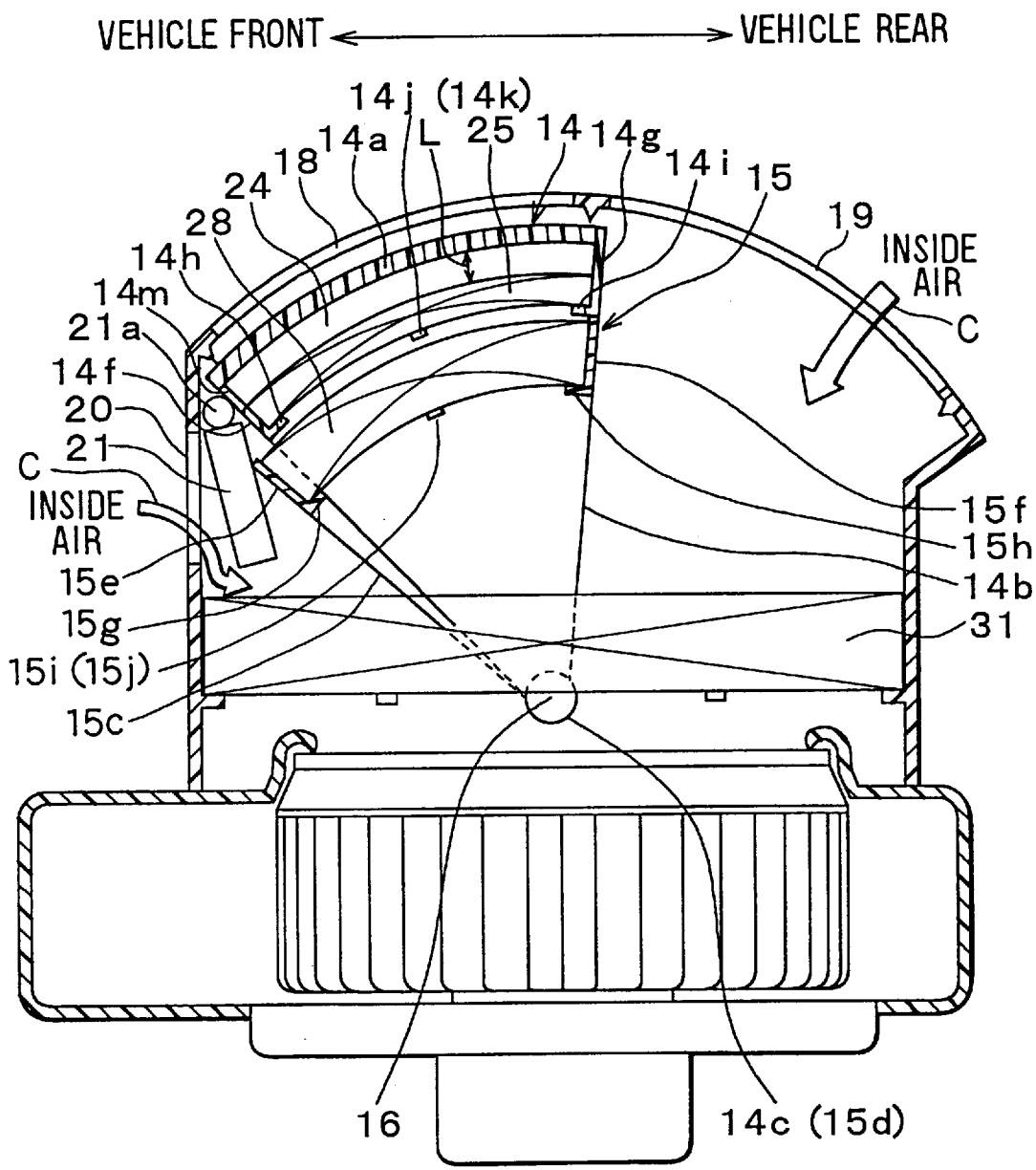
FIG. 9 is a longitudinal sectional view showing the inside/outside air switching device having the deodorizing filters in a whole inside air mode according to the first embodiment.

In the ordinary whole inside air mode shown in FIG. 9, the inside air C from both of the inside air intake port 19 and the auxiliary inside air intake port 20 directly flows through the dust filter 31 without passing through the first and second deodorizing filters 25 and 28. The arrangement minimizes pressure loss due to the deodorizing filters 25 and 28 having high air flow resistance. Therefore, in the whole inside air mode, the amount of air to be blown into the air conditioning unit is increased, and the air conditioning capability for the passenger compartment can be improved.

Figure 10:
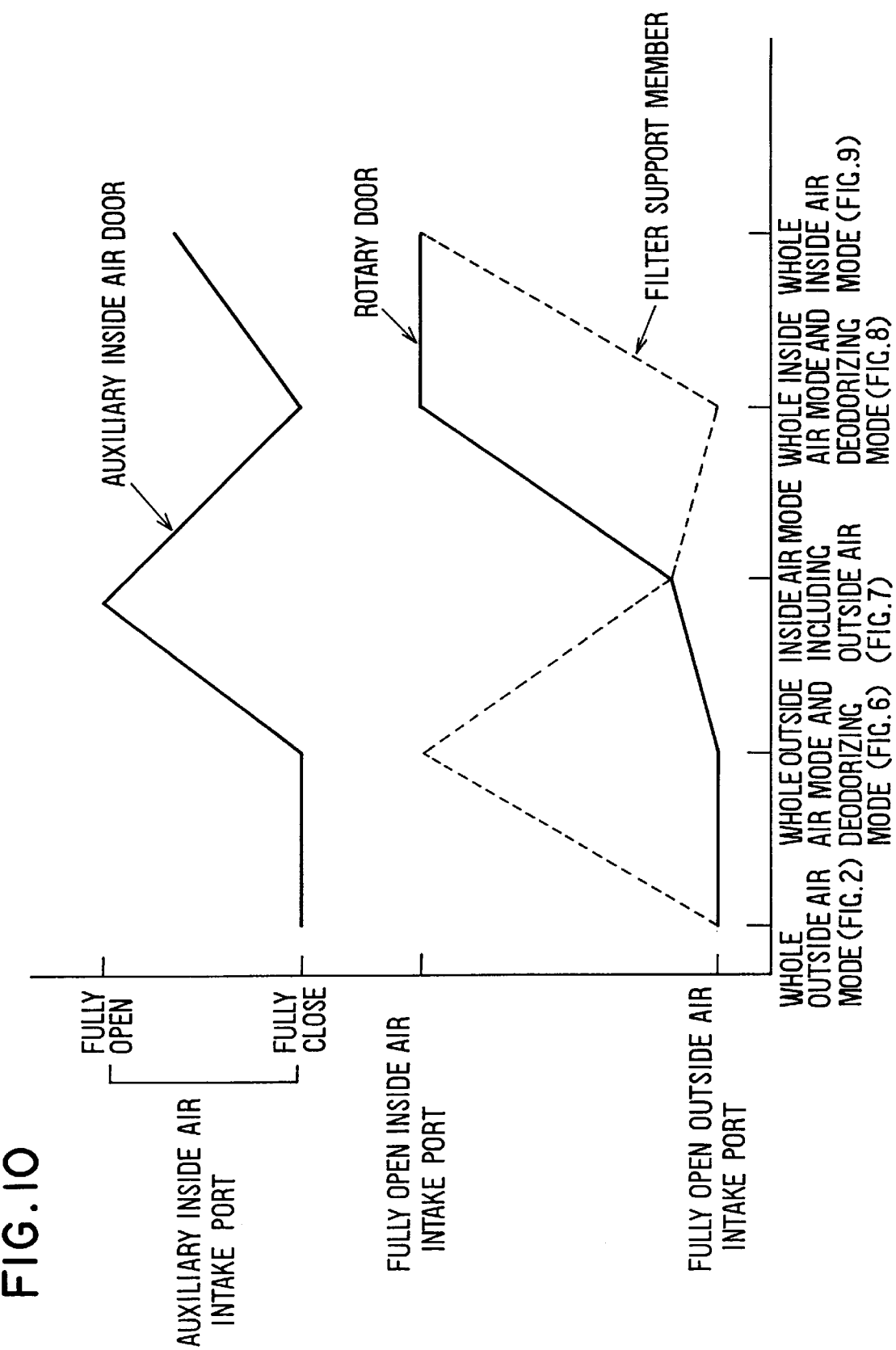
FIG. 10 is a view showing graphic characteristics of door operation patterns of the first embodiment.

As described above, the first embodiment has five air intake modes: (1) whole outside air mode and deodorization mode shown in FIG. 6; (2) partial outside air-mixed inside air mode (with outside air deodorized) shown in FIG. 7; (3) ordinary whole outside air mode shown in FIG. 2; (4) whole inside air mode and deodorization mode shown in FIG. 8; and (5) ordinary whole inside air mode shown in FIG. 9. FIG. 10 is a graph showing characteristics of door operation patterns when the rotary door 14, filter support member 15 and auxiliary inside air door 21 are operated in the above-described five air intake modes.

A second preferred embodiment of the present invention will be now described.

Figure 11:
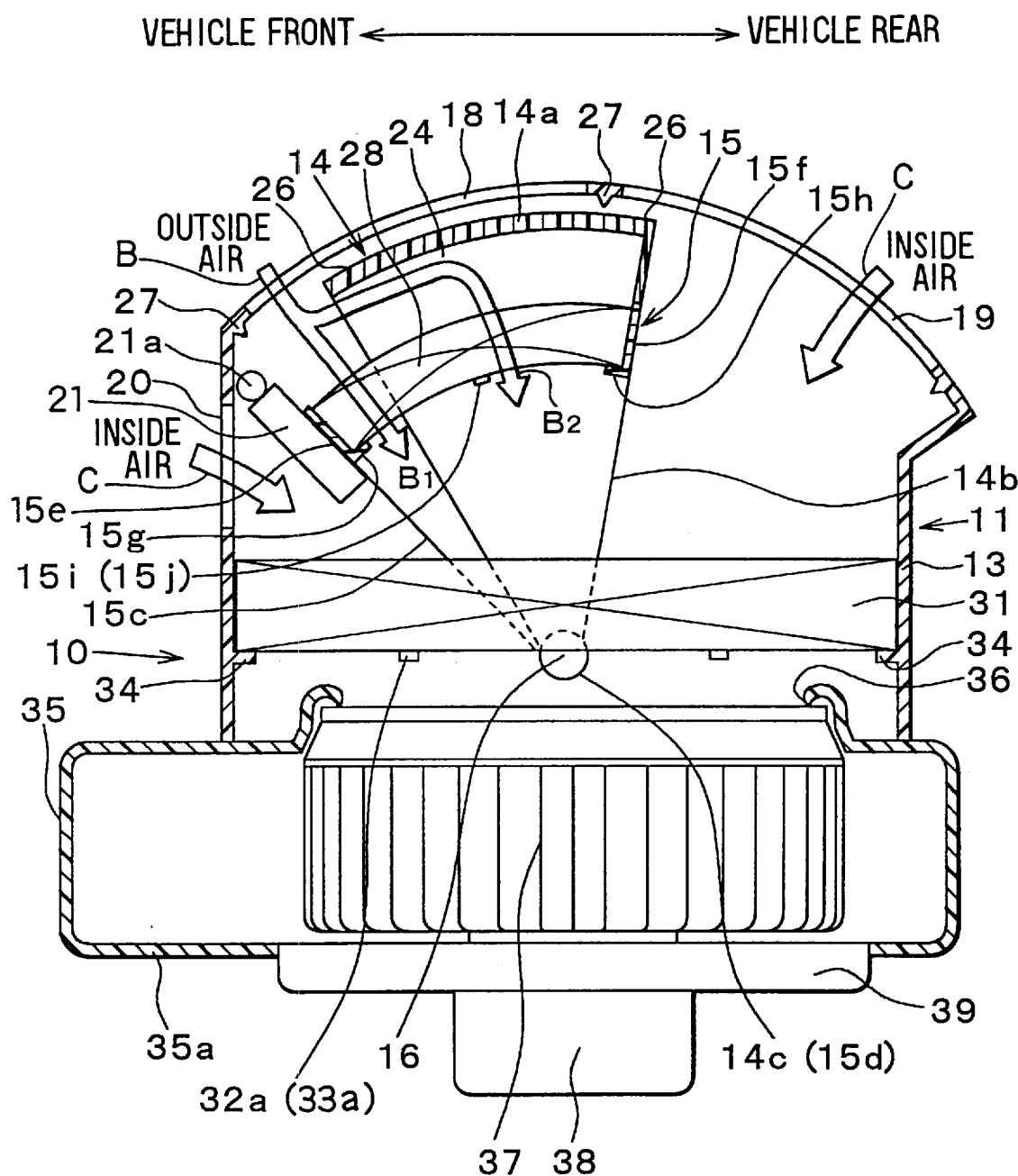
FIG. 11 is a longitudinal sectional view showing an inside/outside air switching device having a deodorizing filter in a partial outside air-mixed inside air mode according to a second preferred embodiment of the present invention.
Figure 12:
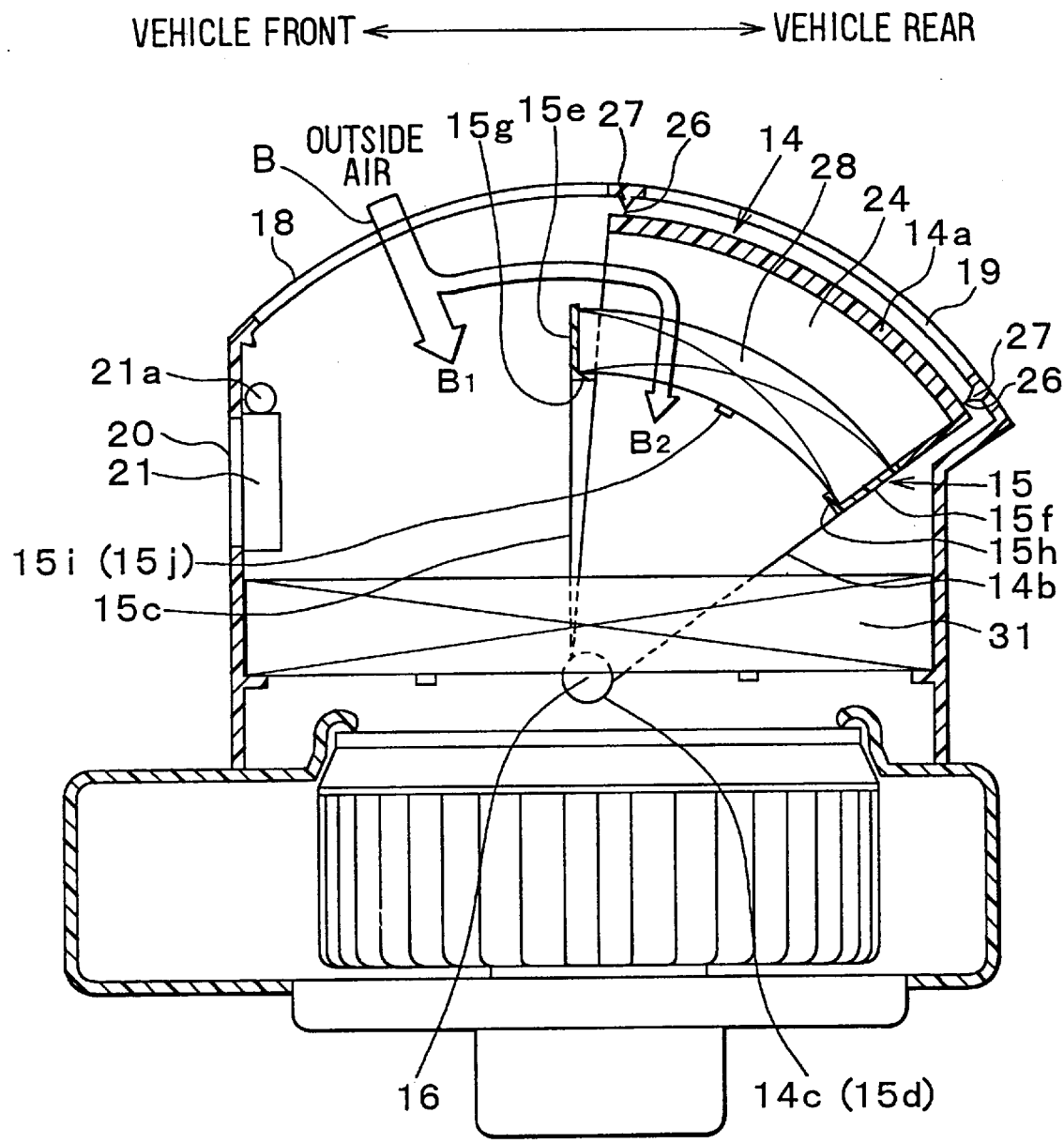
FIG. 12 is a longitudinal sectional view showing the inside/outside air switching device having the deodorizing filter in a whole outside air mode according to the second embodiment.
Figure 13:
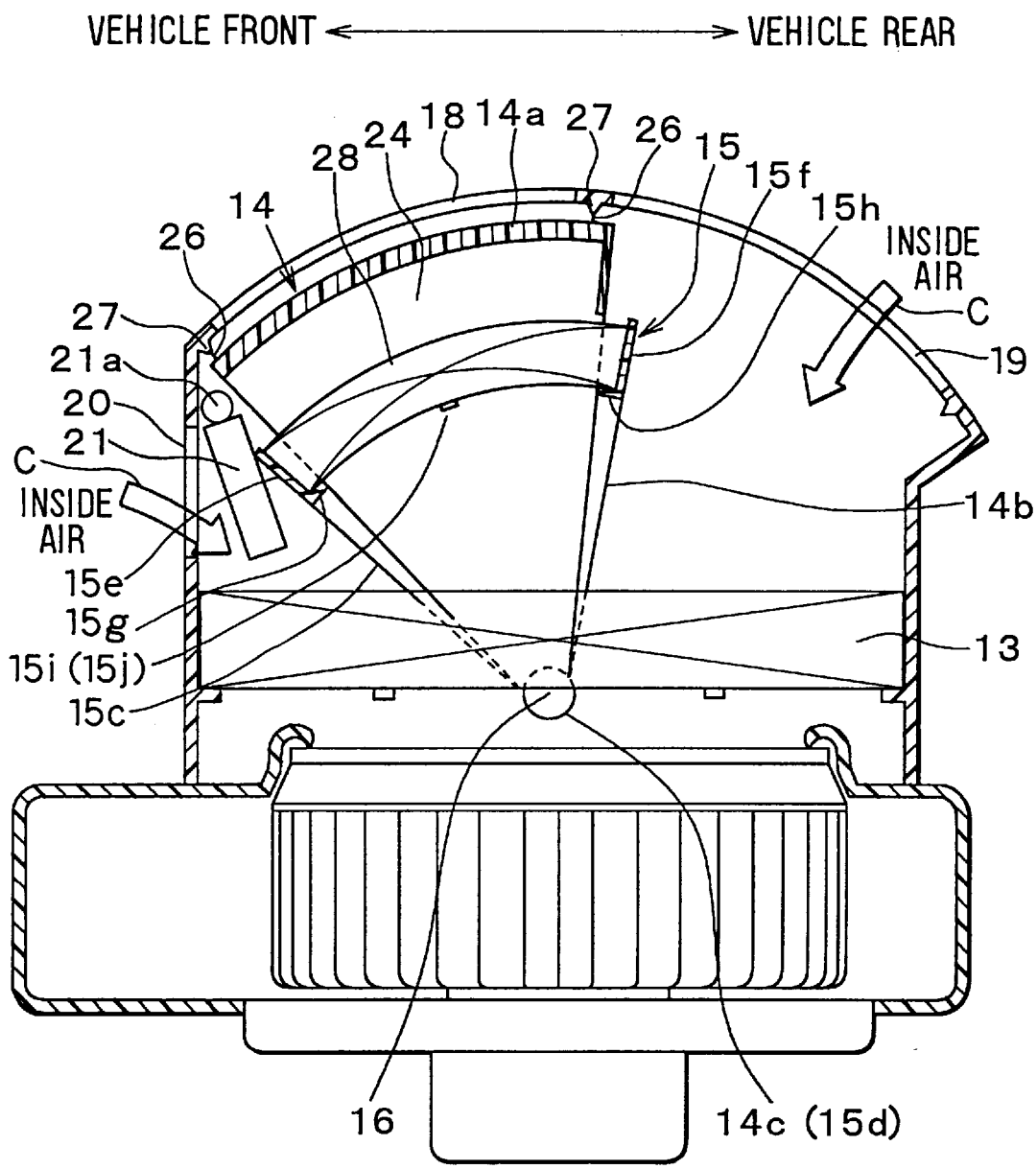
FIG. 13 is a longitudinal sectional view showing the inside/outside air switching device having the deodorizing filter in a whole inside air mode according to the second embodiment.

In the above-described first embodiment, the rotary door 14 and the filter support member 15 are equipped with the first and second deodorizing filters 25 and 28 respectively. In the second embodiment, the rotary door 14 is free of the first deodorizing filter 25 as illustrated in FIGS. 11 through 13. That is, in the second embodiment, the first deodorizing filter 25 is omitted. Correspondingly, the rotary door 14 dispenses with the support plate 14f at one circumferential end of the circumferential wall 14a, with the opening 14m in the support plate 14f, and with the projections 14h through 14k supporting the bottom of the first deodorizing filter 25.

As another difference, in the above-descrived first embodiment, the filter support member 15 does not project circumferentially outside the rotary door 14, so that the filter support member 15 is held radially inside the rotary door 14. Accordingly, the second deodorizing filter 28 provided in the filter support member 15 does not project circumferentially outside the rotary door 14. However, in the second embodiment, the filter support member 15 is allowed to project circumferentially outside the rotary door 14, and the filter support member 15 is received radially inside the rotary door 14. As a result, the second deodorizing filter 28 provided in the filter support member 15 is disposed to project circumferentially outside the rotary door 14.

FIG. 11 illustrates a partial outside air-mixed inside air mode (with outside air deodorized) corresponding to the state in FIG. 7 of the first embodiment. In FIG. 11, each of the rotary door 14 and filter support member 15 is operated at an intermediately opened position in which the outside air intake port 18 is slightly opened and the inside air intake port 19 is widely opened. The auxiliary inside air door 21 is operated to open the auxiliary inside air intake port 20. At this time, the second deodorizing filter 28 in the filter support member 15 projects circumferentially outside the rotary door 14 toward the outside air intake port 18.

Thus, the outside air (B) from the outside air intake port 18 branches into two currents, that is, an air current $B_2$ that flows into the gap 24 inside the circumferential wall 14a of the rotary door 14 and passes through the second deodorizing filter 28, and an air current ($B_1$) that directly passes through the second deodorizing filter 28 without flowing into the gap 24. According to the second embodiment, the second deodorizing filter 28 projects circumferentially outside the rotary door 14 toward the outside air intake port 18 to increase the amount of outside air passing through the second deodorizing filter 28 for deodorization.

FIG. 12 shows the second embodiment in its ordinary whole outside air mode corresponding to the state in FIG. 2 of the first embodiment. In FIG. 12, the rotary door 14 and filter support member 15 are operated at the rightmost position to fully open the outside air intake port 18 and to fully close the inside air intake port 19. The auxiliary inside air door 21 is operated to close the auxiliary inside air intake port 20. Therefore, the greater part ($B_1$) of the outside air (B) from the outside air intake port 18 directly flows into the dust filter 31. The remaining part ($B_2$) of the outside air (B) flows into the gap 24 and passes through the second deodorizing filter 28 for deodorization and dust removal.

FIG. 13 shows the second embodiment in its ordinary whole inside air mode corresponding to the state in FIG. 9 of the first embodiment. In FIG. 13, the rotary door 14 and filter support member 15 are operated to the leftmost position to fully close the outside air intake port 18 and to fully open the inside air intake port 19. The auxiliary inside air door 21 is operated to open the auxiliary inside air inlet door 20. Therefore, the inside air C from both the inside air intake port 19 and the auxiliary inside air intake port 20 directly flows into the dust filter 31 which removes dust from the inside air C. Because the second deodorizing filter 28 projects circumferentially outside the rotary door 14 toward the inside air intake port 19, a part of the inside air C from the inside air intake port 19 passes through the second deodorizing filter 28 for deodorization and dust removal.

Similarly to the first embodiment, in the second embodiment, the rotary door 14 and the filter support member 15 are respectively rotated at different positions to set modes corresponding to the whole outside air and the deodorization mode shown in FIG. 6 and to the whole inside air mode and the deodorization mode shown in FIG. 8 of the first embodiment.

A third preferred embodiment of the present invention will be now described with reference to FIGS. 14 through 17.

Figure 14:
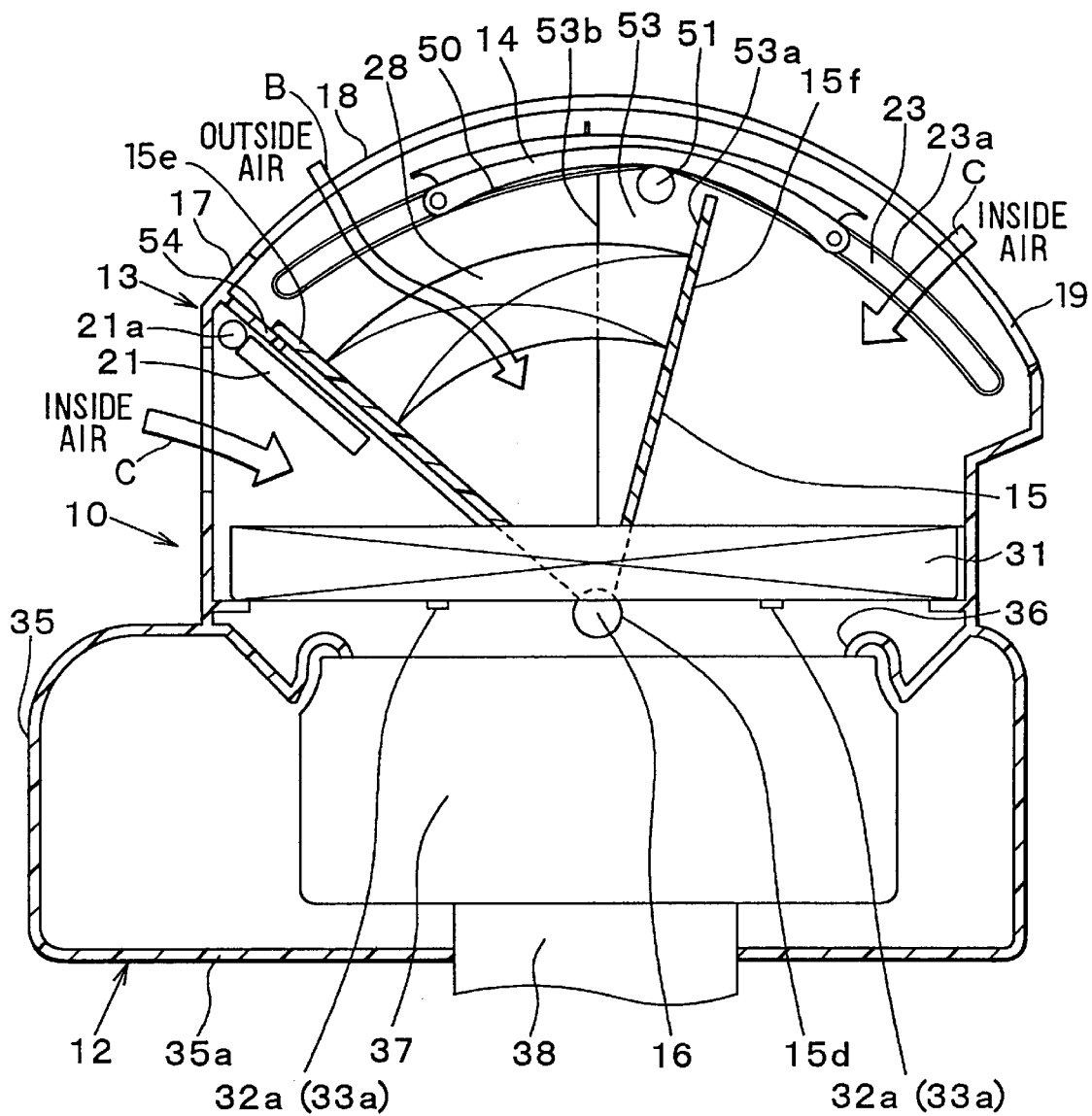
FIG. 14 is a longitudinal sectional view showing an inside/outside air switching device having a deodorizing filter in a partial outside air-mixed inside air mode according to a third preferred embodiment of the present invention.
Figure 15:
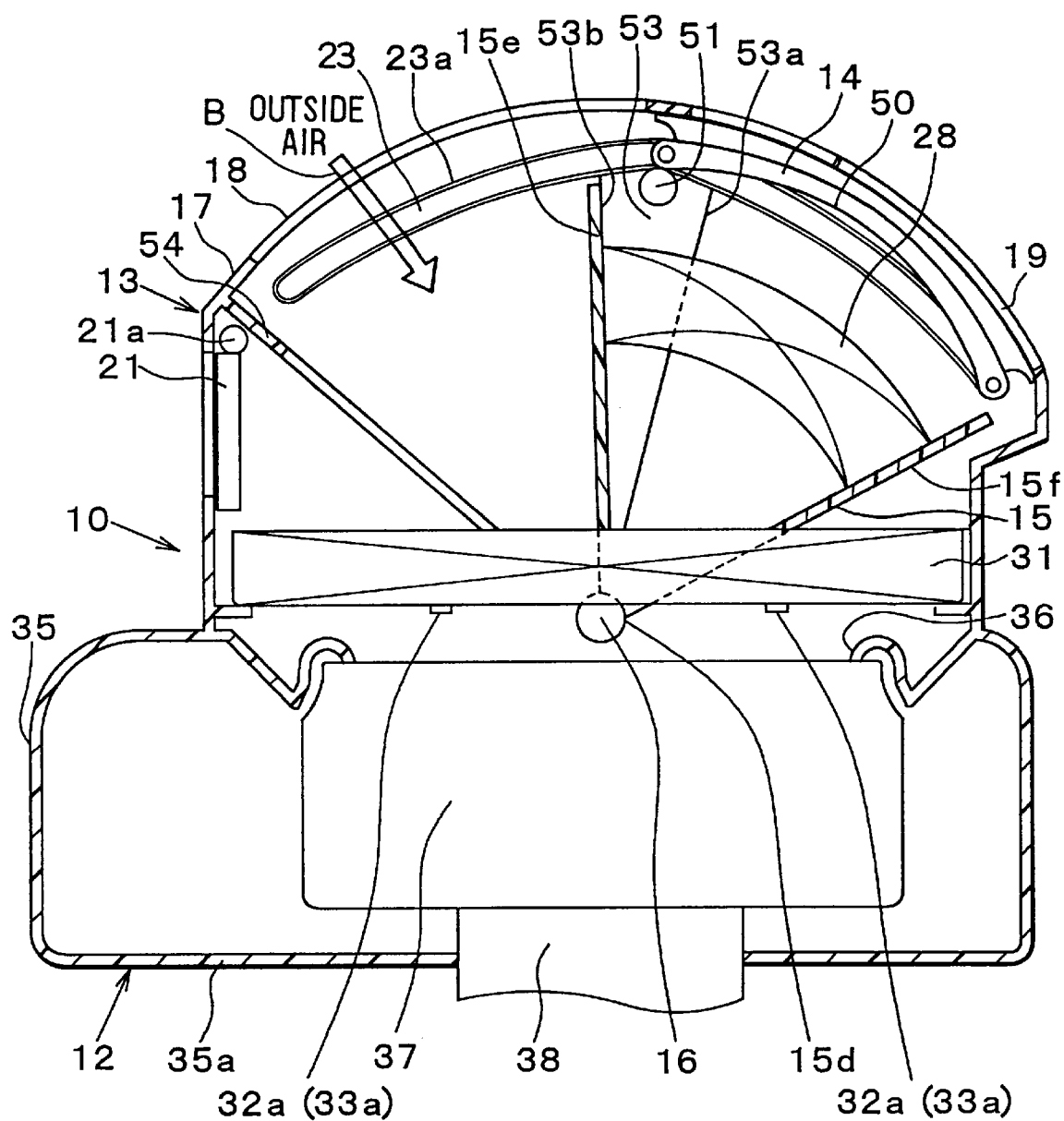
FIG. 15 is a longitudinal sectional view showing the inside/outside air switching device having the deodorizing filter in the whole outside air mode according to the third embodiment.
Figure 16:
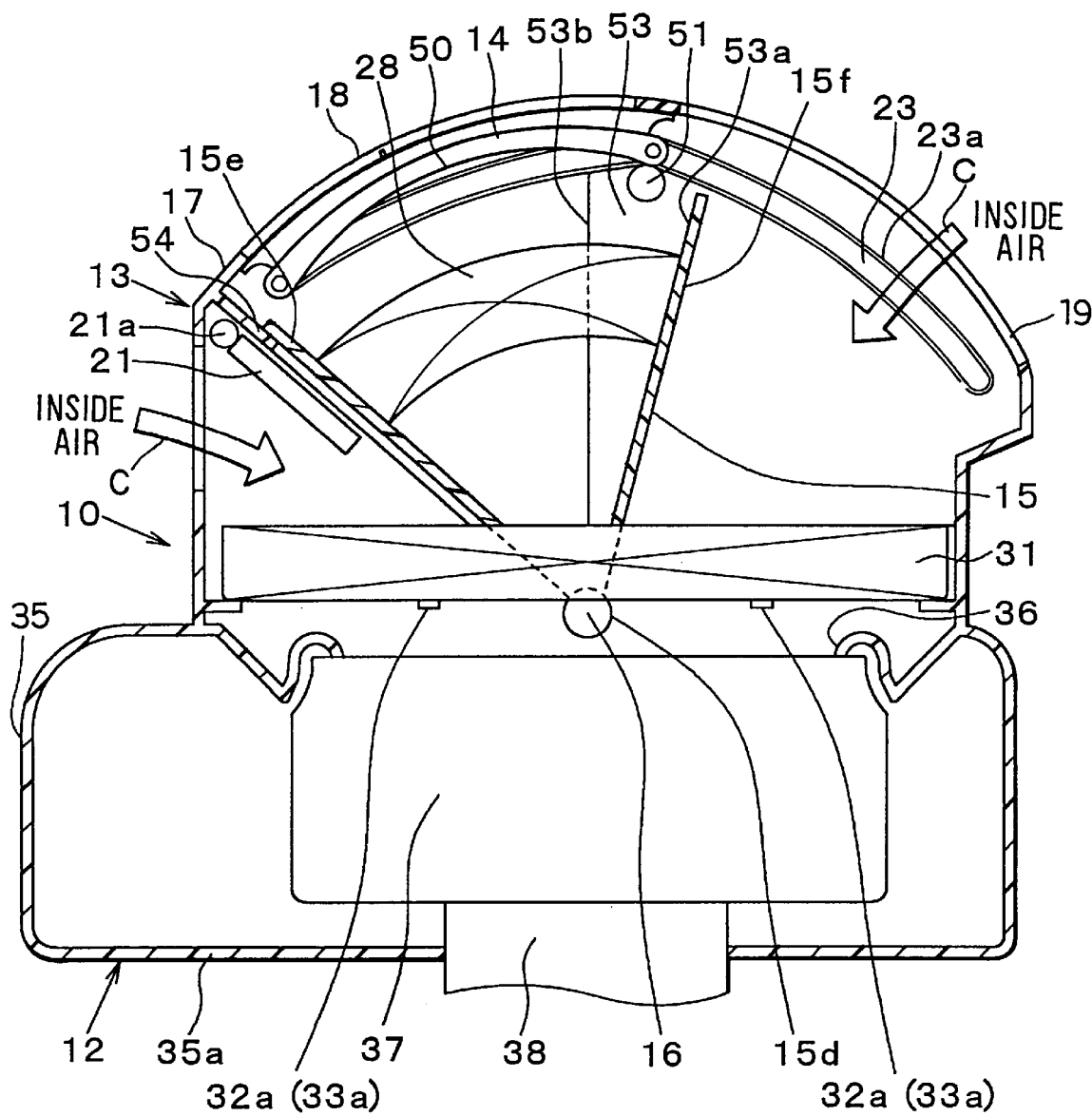
FIG. 16 is a longitudinal sectional view showing the inside/outside air switching device having the deodorizing filter in the whole inside air mode according to the third embodiment.

In the third embodiment, these modes are basically the same as those of the above-described second embodiment. Specifically, FIGS. 14, 15 and 16 show the partial outside air-mixed inside air mode (with outside air deodorized), the ordinary whole outside air mode, and the ordinary whole inside air mode of the third embodiment corresponding to the states in FIGS. 11 through 13, respectively.

In the third embodiment, the rotary door 14 for inside/outside air switching is formed by a substantially arc-shaped circumferential wall 14a. A toothed surface 50 is formed over the radially inner surface of the circumferential wall 14a to directly engage with a drive gear 51. The drive gear 51 is coupled to the servo motor 47 (see FIG. 3) by means of a rotating shaft (not shown). Therefore, the rotational force of the servo motor 47 is transmitted into the drive gear 51 to rotate the rotary door 14.

At both circumferential ends and at both axial ends of the circumferential wall 14a of the rotary door 14, there are integrally formed cylindrical support shafts 14e (corresponding to the support shaft 14e in FIG. 1) projecting outward. That is, four support shafts 14e are attached to the circumferential wall 14a of the rotary door 14. Circular bearing grooves 23 (corresponding to the bearing groove 23 in FIG. 1) each accommodating two support shafts 14e in a loosely fit manner are provided in projected portions 23a (see FIG. 17) on the side walls of the inside/outside air switching box 13.

Every two support shafts 14e are loosely inserted into and slidably supported by each circular bearing groove 23. An angle of circumference of the bearing grooves 23 determines the maximum rotatable range (i.e., rotating angle) of the rotary door 14.

An elastic sealing member 26 made of an elastic material such as rubber is fastened by adhesives to the radially outer surface of the circumferential wall 14a of the rotary door 14. The sealing member 26 constitutes a rectangular frame that corresponds to the opening edges of the outside air intake port 18 and inside air intake port 19. If the sealing member 26 is continuously pressed against the inner surface of the arc-shaped circumferential wall 17 of the inside/outside air switching box 13 when the rotary door 14 is operated, a rotational operation force of the rotary door 14 may be increased by friction at the tip portion of the sealing member 26.

In the third embodiment, when the rotary door 14 is rotated intermediately between its whole outside air intake position shown in FIG. 15 and its whole inside air intake position shown in FIG. 16, the tip of the sealing member 26 is separated from the radially inner surface of the circumferential wall 17. The rotary door 14 and the circular bearing grooves 23 are set so that the rotated position of the rotary door 14 is shifted toward the rotating center 16 (i.e., inside in the radial direction) when the rotary door 14 is rotated to an intermediate position between the whole outside air position shown in FIG. 15 and the whole inside air position shown in FIG. 16.

Therefore, when the rotary door 14 is rotated to the intermediate position, a little or no friction is applied to the tip of the sealing member 26; and therefore, the rotational operation force of the rotary door 14 can be decreased. However, at the intermediate position, the sealing operation may be not proposed by the sealing member 26. Therefore, when the rotary door 14 is rotated at an intermediate position representing the partial outside air-mixed inside air mode shown in FIG. 14, outside air passes through the loosely fit portions between the support shafts 14e and the circular bearing grooves 23. Because the outside air having passed through the loosely fit portions is directly mixed into the inside air flowing from the inside air intake port 19, the mixed outside air is not deodorized by the deodorizing filter 28.

Figure 17:
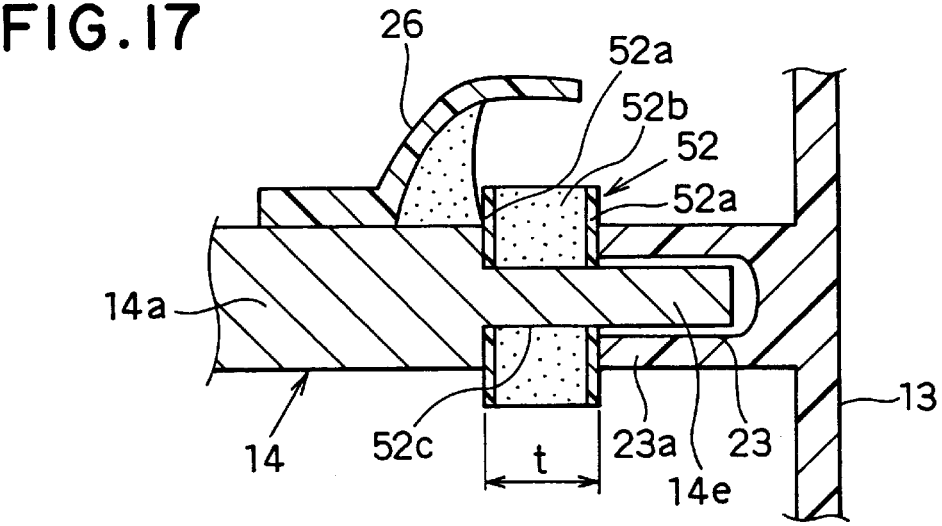
FIG. 17 is an enlarged sectional view of a support shaft portion of a rotary door of the inside/outside air switching device according the third embodiment.

As shown in FIG. 17, in the third embodiment, the support shafts 14e are provided with sealing members 52 to prevent the bypassing outside air flow. Each sealing member 52 is of a circular shape formed along the axial end surface of the circumferential wall 14a of the rotary door 14. Each sealing member 52 includes two side plates 52a and an elastic body 52b bonded between the two plates 52a. The sealing member 52 has an axially penetrating hole 52c into which the support shaft 14e of the rotary door 14 is inserted. The sealing member 52 is interposed and held between the axial end surface of the circumferential wall 14a of the rotary door 14 and the end surface of the projecting portion 23a on the side wall of the inside/outside air switching box 13.

When the rotary door 14 is rotated, one of the two side plates 52a slides over the end surface of the projecting portion 23a of the side wall of the inside/outside air switching box 13. The sliding operation requires that the side plates 52a is made of a low-friction material such as stainless steel. The elastic body 52b has an elastic resilience absorbing dimensional deviations of the components in the axial direction, and pushes reliably the two side plates 52a against the axial end surface of the circumferential wall 14a of the rotary door 14 as well as against the end surface of the projecting portion 23a on the side wall of the inside/outside air switching box 13. Illustratively, the elastic body 52b is made of porous urethane form. When the sealing member 52 is assembled, the elastic body 52b is suitably compressed so that the sealing member 52 will have a predetermined thickness "t" in the axial direction. At the other side in the axial direction, the sealing member 52 may alternatively dispense with the elastic body 52b and one side plate 52a. That is, at the other side in the axial direction, the sealing member 52 may be formed by only one side plate 52a.

In the third embodiments, as described above, the sealing members 52 are each disposed to press against the axial end surface of the circumferential wall 14a of the rotary door 14 as well as against the end surface of the projecting portion 23a on the side wall of the inside/outside air switching box 13. Therefore, it prevents outside air passes through the loosely fit portions between the support shafts 14e and the circular bearing grooves 23.

In the third embodiment, because the rotating shaft 15d of the filter support member 15 is connected to the rotating shaft 21a of the auxiliary inside air door 21 by a link mechanism (not shown), the filter support member 15 and the auxiliary inside air door 21 are integrally operated by the one servomotor 48.

At the circumferential center on the side wall of the inside/outside air switching box 13, there is provided a first frame-shaped projection 53 that constitutes a contacting frame for the support plates 15e and 15f at both circumferential ends of the filter support member 15. Adjacent to the auxiliary inside air door 21, a second frame-shaped projection 54 is formed. The second frame-shaped projection 54 forms a contacting frame for the support plate 15e at one circumferential end of the filter support member 15.

When the rotary door 14 is rotated to the position representing the partial outside air-mixed inside air mode shown in FIG. 14, the support plate 15e at one circumferential end of the filter support member 15 contacts the second frame-shaped projection 54. It prevents outside air from passing through one circumferential end of the deodorizing filter 28 (i.e., the left side end in FIG. 14). At the same time, the support plate 15f at the other circumferential end of the filter support member 15 contacts the sealing surface 53a on one side of the first frame-shaped projection 53. Therefore, it prevents outside air from passing through the other circumferential end of the deodorizing filter 28 (i.e., the right side end in FIG. 14).

In the ordinary whole outside air mode shown in FIG. 15, the support plate 15e at one circumferential end of the filter support member 15 contacts a sealing surface 53b on the other side of the first frame-shaped projection 53. It prevents outside air from passing through the deodorizing filter 28, and thereby prolonging the service life of the filter 28. similarly to the ordinary whole outside air mode, in the ordinary whole inside air mode shown in FIG. 16, it prevents inside air from passing through the deodorizing filter 28, and thereby prolonging the service life of the filter 28.

The other portions of the third embodiment are the same as those of the second embodiment and will not be described further.

In the above-described second and third embodiments, the first deodorizing filter 25 is removed from the rotary door 14. However, the filter support member 15 and the second deodorizing filter 28 may both be eliminated, and only the rotary door 14 and the first deodorizing filter 25 may be used. In this case, it is impossible to form an air intake mode in which the filter support member 15 would be rotated to a position different from that of the rotary door 14 (i.e., the mode corresponding to the whole outside air mode and the deodorization mode shown in FIG. 6 and the whole inside air mode and the deodorization mode shown in FIG. 8). That is, only three air intake modes, i.e., the partial outside air-mixed inside air mode (with outside air deodorized), the ordinary whole outside air mode, and the ordinary whole inside air mode are possible.

In the above-described first embodiment, the rotary door 14 and filter support member 15 are equipped with the first and second deodorizing filters 25 and 28 respectively. However, a dust filter may be positioned at an upstream air side of the first and the second deodorizing filters 25 and 28, the dust filter may be rotated integrally with the rotary door 14 and filter support member 15. In this case, because air having passed through the dust filter flows through the first and second deodorizing filters 25 and 28, it prevents dust within air from being attached to the first and second deodorizing filters 25 and 28 to prolong the service life of the first and second deodorizing filters 25 and 28. The dust filter disposed at an upstream air side of the first and second deodorizing filters 25 and 28 can filter dust particles within air. Therefore, in this case, the dust particles are not absorbed in the first and second deodorizing filters 25 and 28.

In the above-described first embodiment, the rotary door 14, the filter support member 15 and the auxiliary inside air door 21 are driven independently by the servo motors 47 through 49 (i.e., actuators) respectively. Alternatively, it is possible to eliminate the servo motor 49 driving the auxiliary inside air door 21, so that the auxiliary inside air door 21 may be operatively with the rotary door 14 or the filter support member 15 by a suitable link mechanism. In the third embodiment, the auxiliary inside air door 21 is operatively linked with the filter support member 15.

In the above-described first and second embodiments, the rotary door 14 (i.e., inside/outside air switching door) and filter support member 15 are designed to rotate around the single rotating center 16. However, the circumferential wall 17 of the inside/outside air switching box 13 may be eliminated and replaced by a flat wall in which the outside air intake port 18 and inside air intake port 19 may be formed. The inside of the flat wall may be equipped with a flat inside/outside air switching door 14 that may be moved slidably along the flat wall surface. Further inside the inside/outside switching door 14 (i.e., downstream air side), a flat-shaped filter support member 15 may be slidably provided. Further, the above-described present invention may be applied to an inside/outside air switching device that has neither the auxiliary inside air intake port 20 nor the auxiliary inside door 21.

A fourth preferred embodiment of the present invention will be now described.

FIG. 18 is a schematic sectional view of an air conditioning apparatus according to the fourth embodiment of the present invention. As illustrated in FIG. 18, the air conditioning apparatus includes an air conditioning unit 200 and a blower unit 100 for introducing air into the air conditioning unit 200. The blower unit 100 is disposed under the instrument panel in the passenger compartment to face the front passenger's seat (i.e., the left side in the left-right direction of a right-hand drive vehicle). The air conditioning unit 200 is positioned under the instrument panel at an approximate center portion in the left-right direction of the vehicle.

The blower unit 100 is a well-known type including an inside/outside air switching box 111 and a blower unit (i.e., ventilating means) 117 for blowing air introduced from the inside/outside air switching box 111 into the air conditioning unit 200. The inside/outside air switching box 111 made of resin (e.g., polypropylene) switches inside and outside air to be introduced.

The inside/outside air switching box 111 has an outside air intake port 112 and an inside air intake port 113. The two intake ports 112 and 113 are opened and closed by a plate-like inside/outside air switching door 114 which can be rotated between the position indicated by solid line and the position indicated by dashed line in FIG. 18. The outside air intake port 112 and the inside air intake port 113 have substantially the same opening area.

At the outside air intake port 112, an outside air intake duct 120 made of resin is provided to guide outside air from outside air inlet holes (not shown) provided at a front side of the vehicle into the outside air intake port 112. The outside air intake duct 120 includes an outside air intake duct 121 made of resin and designed to lead outside air in the duct 120 toward a downstream air side of the two intake ports 112 and 113, i.e., an immediately upstream air side of the blower 117 in the fourth embodiment. The outside air intake duct 121 is equipped with a plate-like resin door 122 for opening and closing the outside air intake duct 121.

The opening area of the outside air intake duct 121 is about 20 percents of that of the outside air intake port 112 or the inside air intake port 113. In a clean outside air-mixed inside air mode, nine parts of inside air and one part of clean outside air are introduced into the blower 117 (i.e., in a case where outside air is substantially small as compared with inside air).

The entire inner surface of the outside air intake duct 121 is provided with deodorizing filter 115 and dust filter 160. The deodorizing filter 115 adsorbs malodorous particles from the outside air (e.g., acetaldehyde in diesel exhaust fumes), and the dust filter 160 removes dust from the outside air. The deodorizing filter 115 is constituted by plate-shaped deodorants such as active carbon, and is formed to have a thickness of 15 mm, for example. The dust filter 160 is made of urethane foam, and is formed in a plate like to have a thickness of 15 mm, for example. The two kinds of filters 115 and 160 are formed integrally.

In the entire inner surface of the inside/outside air switching box 111, the dust filter 116 for removing dust from inside and outside air is provided. The dust filter 116 is made of paper, and is formed in a corrugated sheet like. The deodorizing filter 115 of the above constitution has a considerably higher air flow resistance than that of the dust filters 116 and 160 (about 1.5 times that of the latter).

The blower 117 includes a centrifugal multiblade fan 171, an electric motor 172 for driving the fan 171, and a scroll casing 173 made of resin and designed to accommodate the fan 171. The scroll casing 173 has a bell-mouth like intake port 173a that guides the outside air from the outside air intake port 112 and outside air inlet duct 121 as well as the inside air from the inside air intake port 113 into the fan 172.

The air conditioning unit 200 includes an air conditioning case 103 made of resin. One end of the air conditioning case 103 is connected to an outlet portion of the scroll casing 173, and the other end of the air conditioning case 103 includes an air outlet mode switching unit 225. At the most upstream air side of the air conditioning case 103, an evaporator 210 as a heating heat exchanger for cooling air passing therethrough is disposed. At a downstream air side of the evaporator 210, a heater core 220 as a heating heat exchanger for heating air passing therethrough is disposed. The evaporator 210 and heater core 220 are disposed in a substantially perpendicular manner with respect to the air flow.

The evaporator 210 is a part of a well-known refrigeration cycle which includes a compressor, a condenser, a receiver and a decompression device (not shown). The evaporator 210 dehumidifies and cools air passing through the air conditioning case 103. The compressor is driven by the engine through an electromagnetic clutch (not shown). The heater core 220 is a heating heat exchanger that heats air using cooling water for cooling the engine so that air from the evaporator 210 is re-heated by the heater core 220.

Within the air conditioning case 103, a bypass passage 230 is formed adjacent to the heater core 220. Through the bypass air passage 230, air having passed through the evaporator 210 bypasses the heater core 220. At a downstream air side of the evaporator 210 and an upstream air side of the heater core 220, an air mixing door 240 made of a resin plate is disposed. The air mixing door 240 is rotated between a position denoted by solid line and a position indicated by dashed line in FIG. 18. The air mixing door 240 adjusts an amount of air to be supplied to the heater core 220 and an amount of air to be supplied to the bypass air passage 230, so that the temperature of air to be blown into the passenger compartment can be adjusted.

The air outlet mode switching unit 225 is provided to switch an air outlet. The air outlet mode switching unit 225 has a center face air outlet portion 226, a side face air outlet portion (not shown), a foot air outlet portion 227 and a defroster air outlet portion 228. The center face air outlet portion 226 is communicated with a center face air outlet (not shown) for blowing air toward the upper portion of a passenger in the passenger compartment. The side face air outlet portion is communicated with a side face air outlet (not shown). The foot air outlet portion 227 is communicated with a foot air outlet (not shown) for blowing air toward the foot area of the passenger in the passenger compartment. The defroster air outlet portion 228 is communicated with a defroster air outlet (not shown) for blowing air toward the windshield of the vehicle.

Inside the air outlet mode switching unit 225, there are provided with switching doors 260, 270 and 280 each made of a plastic resin plate and designed to open and close the outlet portions 226, 227 and 228 respectively. The switching doors 260, 270 and 280 are each rotated between a position denoted by solid line and a position indicated by dashed line in FIG. 18. The side face air outlet portion is always opened, and is equipped with grills (not shown) located near the side face air outlet. The grills are manually operated by the driver or by a passenger in the passenger compartment to open and close the side face air outlet.

The inside/outside air switching door 114, the door 122, the air mixing door 240, and the doors 260, 270 and 280 have integrally formed rotating shafts 114a, 122a, 224a, 226a, 227a and 228a respectively. These rotating shafts are attached rotatably to bearing recesses (not shown) provided on the air conditioning case 103.

The instrument panel at a front side in the passenger compartment has an air conditioning control switch including an air outlet mode switch, a temperature setting switch, an inside/outside air switch, a fan switch for controlling an amount of air blown by the fan, and an air conditioning switch for starting and stopping the evaporator. These switches are operated by the driver or by the passenger in the passenger compartment.

The air outlet mode switch include a foot mode switch for instructing a food mode in which conditioned air is blown into the passenger compartment from the foot air outlet; a bi-level mode switch for instructing a bi-level mode in which approximately the same amount of conditioned air is blown from the face air outlet and from the foot air outlet; a face mode switch for instructing a face mode in which conditioned air is blown from the face air outlet; a foot/defroster mode switch for instructing a foot/defroster mode in which approximately the same amount of conditioned air is blown out from the foot air outlet and from the defroster air outlet; and a defroster mode switch for instructing a defroster mode in which conditioned air is blown from the defroster air outlet.

The inside/outside air switch includes an inside air intake mode switch for instructing an inside air intake mode in which inside air is introduced, and an outside air intake mode switch for instructing an outside air intake mode in which outside air is introduced.

According to the signals from the switches described above, the doors 114, 122, 240, 260, 270 and 280 are actuated, the electric motor 172 is regulated, the compressor is started and stopped, and water valves for turning on and off the flow of cooling water are controlled accordingly.

Specifically, the air outlet mode switch is operated to rotate the doors 260, 270 and 280 at predetermined positions. The temperature setting switch is operated to change the position into which the air mixing door 240 is rotated (i.e., to change the amount of air sent to the heater core 220 and to the bypass air passage 230). The inside/outside air switch is operated to change the position into which the inside/outside air switching door 114 is rotated (i.e., to control the opening and closing of the inside air intake port 113 and outside air intake port 112).

A $CO_2$ sensor 300 and an odor sensor 310 are also provided. The $CO_2$ sensor 300 detects the $CO_2$ concentration in inside air within the passenger compartment. The odor sensor 310 detects the density of malodorous particles in outside air. Detection signals from the sensors 300 and 310 are input to an electrical control unit 320. In accordance with the signals, the electrical control unit 320 controls the inside/outside air switching door 114 and the door 122 automatically in terms of their rotating positions.

How the inside/outside air switching door 114 and the door 122 are actuated will now be described. First to be explained below are cases in which the inside air intake mode switch is operated by the driver or passenger in a cool-down control (i.e., immediately after cooling operation is started) or in a warm-up control (immediately after heating operation is started).

(1) When the internal $CO_2$ concentration is judged to be not lower than a predetermined value (e.g., 0.5%), the door 114 is actuated to fully open the inside air intake port 113 and fully close the outside air intake port 112, while the door 122 is actuated to fully open the outside air inlet duct 121 (i.e., clean outside air mixed inside air mode). Therefore, inside air is introduced into the air conditioning case 103 through the inside air intake port 113. Part of the cleaned air from the deodorizing filter 115 is admitted through the outside air intake duct 121. The introduced inside air and the cleaned outside air are blown into the passenger compartment.

In the clean outside air mixed inside air mode, the amount of admitted outside air is set to a level such that the internal $CO_2$ concentration is not raised excessively when the maximum allowable number of passengers are in the passenger compartment. In the fourth embodiment, the inside/outside air ratio is set to nine parts of inside air and one part of outside air. The predetermined $CO_2$ concentration value described above is an upper concentration limit at which a passenger in the passenger compartment does not feel unpleasant breathing.

(2) When the internal $CO_2$ concentration is lower than the predetermined value, the door 114 is actuated to fully open the inside air intake port 113 and fully close the outside air intake port 112, while the door 122 is actuated to fully close the outside air intake duct 121 (i.e., whole inside air mode). In this case, only inside air is admitted to the air conditioning case 103 and is blown into the passenger compartment.

In the above-described clean outside air mixed inside air mode, clean outside air is introduced and is mixed into the inside air. That is, clean outside air is added continuously to replace the inside air in the passenger compartment. In this mode, the amount of outside air passing through the deodorizing filter 115 is made smaller as compared with a case where only clean outside air is introduced. Therefore, an amount of air to be blown is decreased, and it is not necessary to improve an air blowing ability of the blower 117, whereby power dissipation is lowered. In addition, the service life of the deodorizing filter 115 is prolonged.

Because the deodorizing filter 115 is used only when the $CO_2$ concentration becomes a high value, the service life of the deodorizing filter 115 is extended accordingly.

According to the fourth embodiment of the present invention, in the clean outside air mixed inside air mode, only a small amount of clean outside air is introduced as compared with the amount of inside air. Therefore, there is not cause a problem in that the amount of air to be blown is decreased, and it is not necessary to improve the air blowing capacity of the blower unit. Furthermore, the service life of the deodorizing filter 115 is effectively prolonged.

When the internal $CO_2$ concentration becomes low, only inside air is introduced to have a small cooling load or a small heating load, and therefore, a cooling operation or a heating operation is performed efficiently. In the whole inside air mode, the introduced air (i.e., inside air) does not pass through the deodorizing filter 115. Therefore, it is compared with the clean outside air mixed inside air mode, the amount of air blown into the passenger compartment is increased.

Next, an operation of the air conditioning apparatus is described when the outside air intake mode switch is operated by a passenger in the passenger compartment.

(1) When the malodorous particle concentration in outside air is not lower than a predetermined value (e.g., 5 ppm), the door 114 is actuated to fully open the inside air intake port 113 and fully close the outside air intake port 112, while the door 122 is actuated to fully open the outside air inlet duct 121 (i.e., clean outside air mixed inside air mode).

(2) When the malodorous particle concentration in the outside air is lower than the predetermined value, the door 114 is actuated to fully close the inside air intake port 113 and fully open the outside air intake port 112, while the door 122 is actuated to fully close the outside air inlet duct 121 (i.e., whole outside air mode).

That is, when outside air contains an appreciable amount of malodorous particles, the outside air filtered by the deodorizing filter 115 is introduced; when outside air contains few malodorous particles, the outside air is introduced through the outside air intake port 112 not equipped with the deodorizing filter 115. The admitted outside air is made to pass through the deodorizing filter 115 only when necessary. Therefore, it possible to extend the service life of the deodorizing filter 115.

In the whole outside air mode, the introduced outside air does not pass through the deodorizing filter 115. It is compared with the clean outside air mixed inside air mode, the amount of air blown into the passenger compartment is increased.

A fifth preferred embodiment of the present invention will be described.

Figure 19:
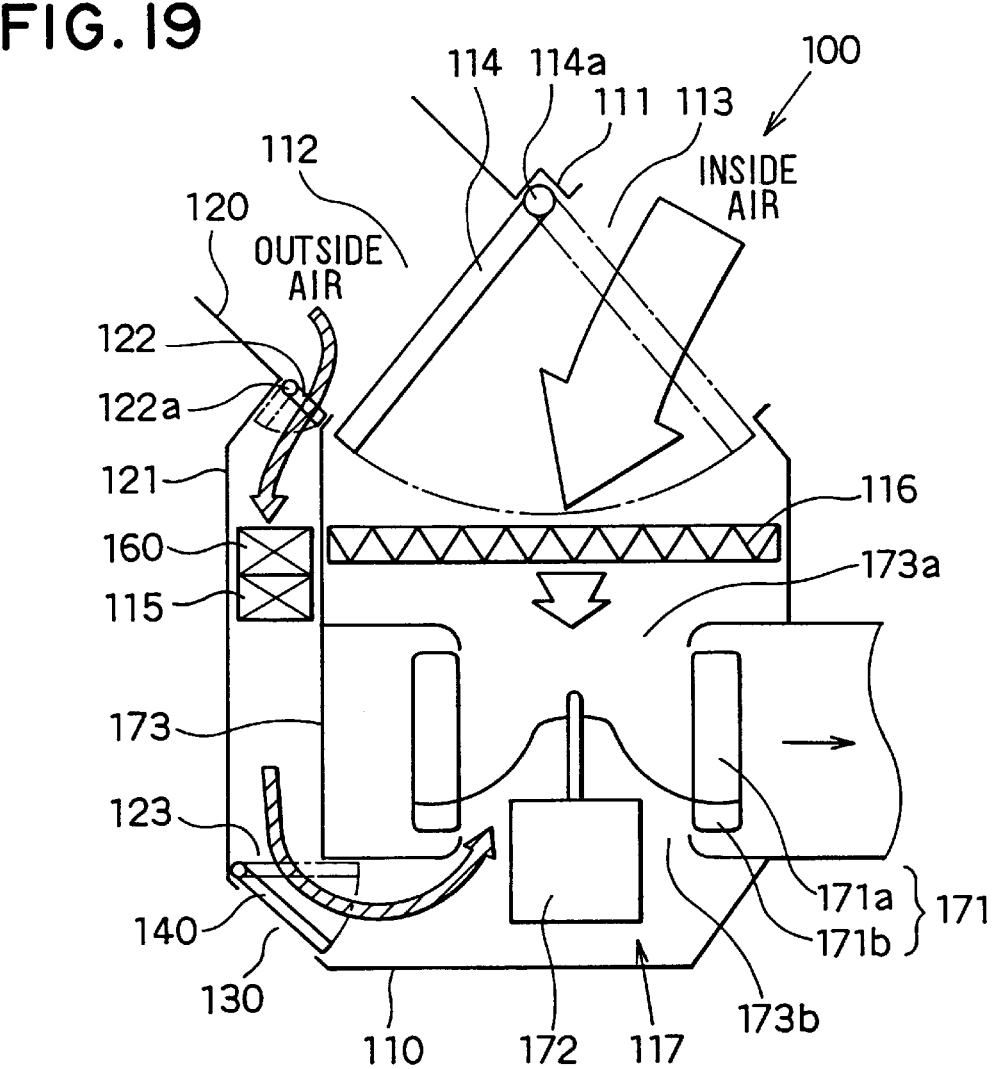
FIG. 19 is a schematic sectional view of a blower unit of an air conditioning apparatus according to a fifth preferred embodiment of the present invention.

In the fifth embodiment, the blower unit 100 of the fourth embodiment is modified. More specifically, as shown in FIG. 19, the fan 171 of the blower 117 is partitioned into a first fan 171a and a second fan 171b. The scroll casing 173 has first and second intake ports 173a and 173b corresponding to the first and the second fans 171a and 171b.

An inside/outside air switching box 110 is also provided at the side of the second air intake port 173b. The inside/outside air switching box 110 has an inside air intake port 130 and an outside air intake port 123. The outside air intake port 123 is connected to a tip of the outside air inlet duct 121 described above. Through the outside air intake port 123, the outside air deodorized by the deodorizing filter 115 is introduced.

A plate-like inside/outside air switching door 140 is provided to open and close the outside air intake port 123 and inside air intake port 130. The inside/outside air switching door 140 is actuated rotatably between the position denoted by solid line and the position indicated by dashed line in FIG. 19.

Below is a description of how the inside/outside air switching doors 114 and 140 as well as the door 122 are actuated.

First, the operations of doors 114, 140 and 122 will be now described when the inside air intake mode switch is operated by the passenger in the passenger compartment.

(1) When the $CO_2$ concentration in inside air is not lower than a predetermined value, the door 114 is actuated to fully open the inside air intake port 113 and fully close the outside air intake port 112; the door 140 is actuated to fully close the inside air intake port 130 and fully open the outside air intake port 123; and the door 122 is actuated to fully open the outside air inlet duct 121 (i.e., the clean outside air mixed inside air mode).

(2) When the $CO_2$ concentration in inside air is lower than the predetermined value, the door 114 is actuated to fully open the inside air intake port 113 and fully close the outside air intake port 112; the door 140 is actuated to fully open the inside air intake port 130 and fully close the outside air intake port 123; and the door 122 is actuated to fully close the outside air inlet duct 121 (i.e., the whole inside air mode).

Next, the operations of doors 114, 140 and 122 will be now described when the outside air intake mode switch is operated by the passenger in the passenger compartment.

(1) When the malodorous particle concentration in outside air is not lower than a predetermined value, the door 114 is actuated to fully open the inside air intake port 113 and fully close the outside air intake port 112; the door 140 is actuated to fully close the inside air intake port 130 and fully open the outside air intake port 123; and the door 122 is actuated to fully open the outside air inlet duct 121 (i.e., the clean outside air mixed inside air mode).

(2) When the malodorous particle concentration in outside air is lower than the predetermined value, the door 114 is actuated to fully close the inside air intake port 113 and fully open the outside air intake port 112; the door 140 is actuated to fully close the inside air intake port 130 and fully open the outside air intake port 123; and the door 122 is actuated to fully close the outside air inlet duct 121 (i.e., the whole outside air mode).

According to the fifth embodiment, the same effects as those of the fourth embodiment can be provided. That is, in the above-described inside air intake mode and clean outside air mixed inside air mode, the inside air and outside air are sucked from both sides of the first and second fans 171a and 171b. Therefore, in the fifth embodiment, an amount of air to be blown to a downstream air side of the bower 117 can be increased as compared with the fourth embodiment. In the clean outside air mixed inside air mode, in particular, inside air from the inside air intake port 113 is sucked by the first fan 171a, and outside air from the outside air inlet duct 121 is sucked by the second fan 171b. Therefore, outside air from the outside air inlet duct 121 can be introduced steadily into the air conditioning case 103 regardless of the air flow resistance of the deodorizing filter 115.

A sixth preferred embodiment of the present invention will be now described with reference to FIGS. 20 and 21.

Figure 20:
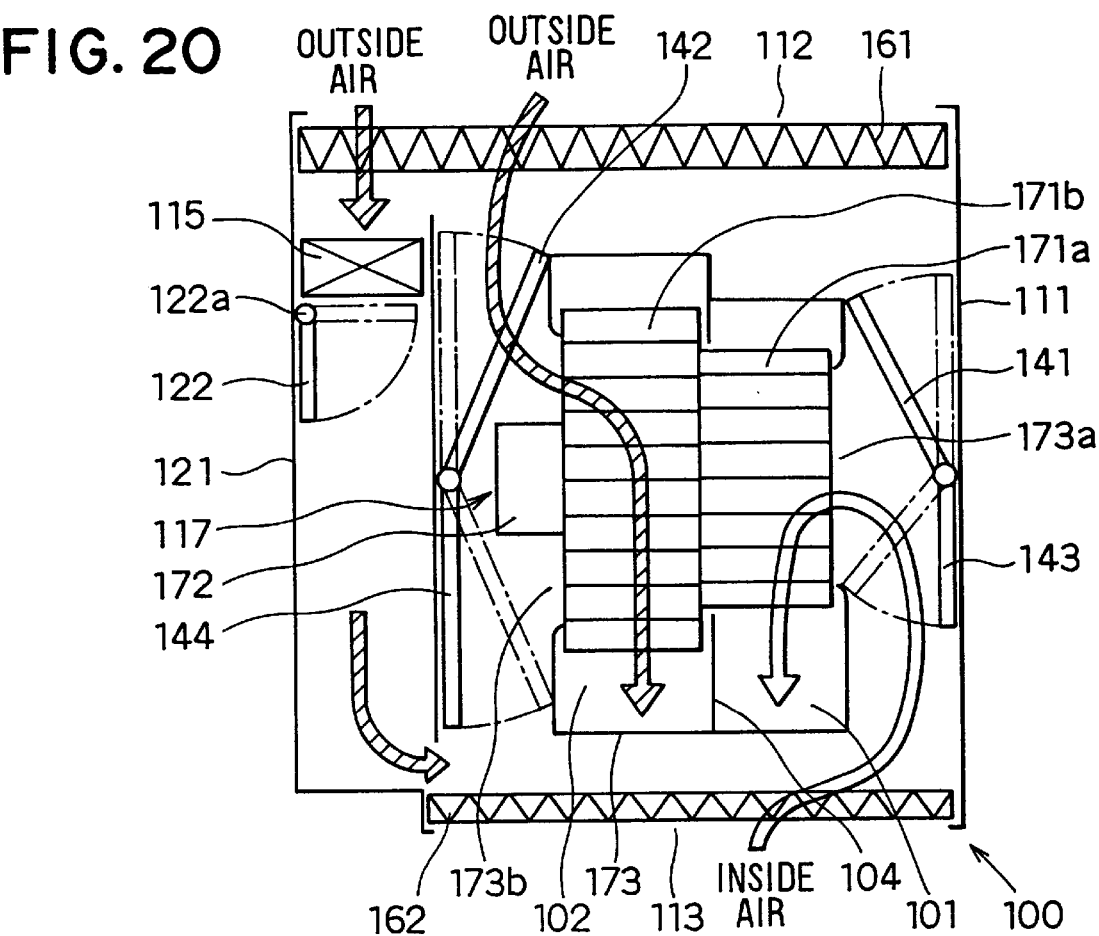
FIG. 20 is a schematic sectional view of a blower unit of an air conditioning apparatus according to a sixth preferred embodiment of the present invention.
Figure 21:
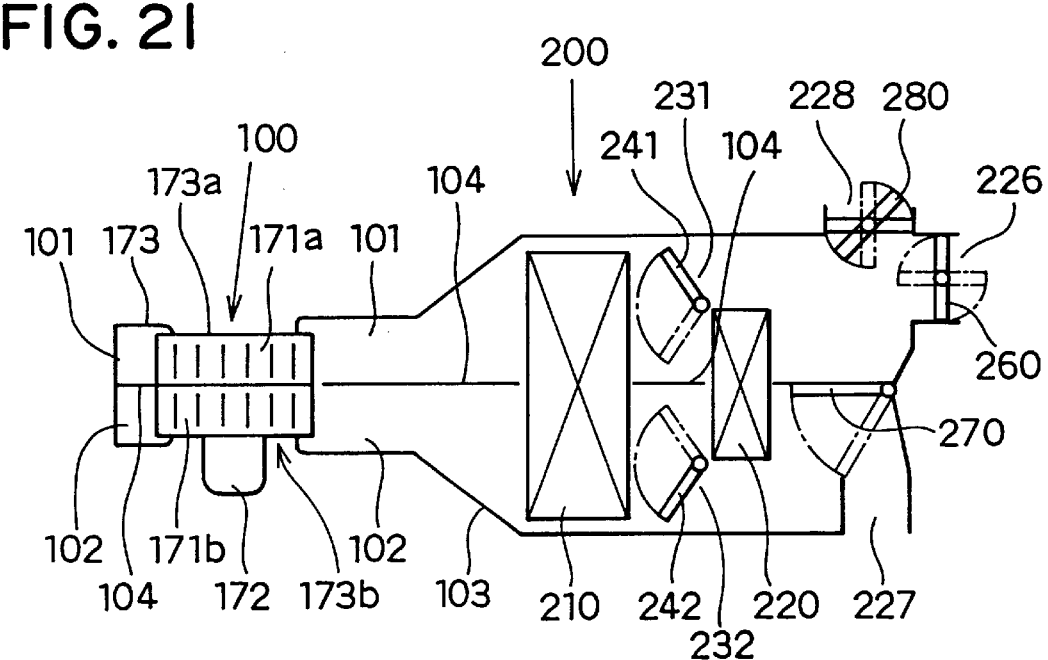
FIG. 21 is a schematic sectional view of the air conditioning apparatus according to the sixth embodiment.

As shown in FIGS. 20 and 21, an air conditioning apparatus of the sixth embodiment has the same blower 117 and scroll casing 173 as those of the fifth embodiment. A partitioning plate 104 partitions inner spaces within the scroll casing 173 and air conditioning casing 103 into a first air passage 101 and a second air passage 102.

In the entire inner surfaces of the outside air intake port 112 and the inside air intake port 113 of the inside/outside air switching box 111, there is provided with dust filters 161 and 162 as shown in FIG. 20. Within the inside/outside air switching box 111, the scroll casing 173 is received. Inside/outside air switching doors 141, 142, 143 and 144 for introducing outside air and inside air are provided between the inside/outside air switching box 111 on the one hand, and the first and second intake ports 173a and 173b of the scroll casing 173 on the other hand.

The doors 141 and 143 are operated integrally to switch the amounts of inside air and outside air sucked into the first intake port 173a. The doors 142 and 144 are also integrally operated to switch the amounts of inside air and outside air sucked into the second intake port 173b. At a downstream air side of the inside air intake port 113, the outside air inlet duct 121 is communicated with an upstream air space of the inside/outside air switching doors 142 and 144.

As shown in FIG. 21, the evaporator 210 is disposed to fully close the first and second air passages 101 and 102, and the heater core 220 is disposed to close about half the first and second air passages 101 and 102 each. Adjacent to the heater core 220, bypass air passages 231 and 232 are respectively provided in the first and second air passages 101 and 102. Air mixing doors 241 and 242 are provided in the first and second air passages 101 and 102 respectively.

In the air conditioning apparatus of the sixth embodiment, outside air is introduced into the first air passage 101 and is blown out from the defroster air outlet 228 and face air outlet 226. Further, inside air is introduced into the second air passage 102 and is blown out from the foot air outlet 227. Therefore, it prevents the windshield from defogging or defrosting, while reducing heating loads.

How the doors 141 through 144 and 122 are actuated will now be described. When the $CO_2$ concentration is lower than a predetermined value and when the malodorous particle concentration is less than a predetermined level, one of a whole inside air mode, a whole outside air mode and an inside/outside air mode is selected. In the whole inside air mode, the doors 141, 143, 142 and 144 are rotated to the positions indicated by solid line in FIG. 20, and the door 122 is rotated to the position denoted by dashed line in FIG. 20. In the whole outside air mode, the doors 141, 143, 142, 144, and 122 are rotated to the positions indicated by dashed line in FIG. 20. In the inside/outside air mode, the doors 141 and 143 are rotated to the positions denoted by solid line in FIG. 20, and the doors 142, 144 and 122 are rotated to the positions indicated by dashed line in FIG. 20.

When the $CO_2$ concentration becomes equal to or higher than the predetermined value in the whole inside air mode, the clean outside air mixed inside air mode is selected (i.e., the doors 141, 143, 142, 144, and 122 are rotated to the positions indicated by solid line in FIG. 20). When the malodorous particle concentration becomes equal to or higher than the predetermined level in the inside/outside air mode or in the whole outside air mode, the clean outside air mixed inside air mode is also selected.

In the sixth embodiment, only a temperature setting switch for setting a desired inside air temperature in the passenger compartment is provided at an operation portion of the instrument panel. Signals from the sensors 300 and 310 as well as signals representing the inside air temperature, the outside air temperature, the sunlight amount, the temperature of air blown from the evaporator, the engine cooling water temperature and other parameters are input into the electric control unit 320. Based on the signals, the electrical control unit 320 controls accordingly the air mixing doors 241 and 242 in their opening degrees; the electric motor 172 in voltage; the doors 141 through 144 and 122 in their opening degree; and doors 226, 227 and 228 in their opening degrees.

In the above-described fourth, fifth and sixth embodiments, the whole inside air mode, the whole outside air mode, and the clean outside air mixed inside mode are automatically switched in accordance with the detected signals from the sensors 300 and 310. However, the whole inside air mode, the whole outside air mode, and the clean outside air mixed inside mode may be switched by a passenger in the passenger compartment. For example, even when the $CO_2$ concentration is not lower than the predetermined value, the whole inside air mode may be selected in the cool-down operation or the warm-up operation.

The deodorizing filter 115 are not limited to the structure described above, but may be constituted by a stack of silica gel formed over urethane foam surfaces. Further, The dust filters 116 and 160 are not limited to the above-described structure; but may be formed by urethane foam or other suitable substances.

As many apparently different embodiments of this invention may be made without departing from the spirit and scope thereof, it is to be understood that the invention is not limited to the specific embodiments thereof except as defined in the appended claims.

What is claimed is:

1. An air conditioning apparatus for a vehicle, comprising:
    an inside/outside air switching box having an outside air intake port for introducing outside air therein, an inside air intake port for introducing inside air therein, and an air outlet through which the introduced air flows outside said inside/outside air switching box;
    an inside/outside air switching door having a wall portion, said inside/outside air switching door being disposed in said inside/outside air switching box to open and close said outside air intake port and said inside air intake port by moving said wall portion; and
    a first deodorizing filter for deodorizing a malodorous particle in air, said first deodorizing filter being disposed at a downstream air side of said wall portion of said inside/outside air switching door to be moved integrally with said wall portion and to form a predetermined gap between said first deodorizing filter and said wall portion, wherein:
        said inside/outside air switching door and said first deodorizing filter are disposed in such a manner that outside air introduced from said outside air intake port flows through said air outlet of said inside/outside air switching box after passing through said gap and said deodorizing filter and inside air introduced from said inside air intake port directly flows through said air outlet of said inside/outside air switching box, when said inside/outside air switching door is moved at an intermediate position in which each of said outside air intake port and said inside air intake port is opened in an intermediate opening degree by said wall portion.

2. The air conditioning apparatus according to claim 1, wherein:
    said inside/outside air switching box includes an auxiliary inside air intake port for introducing inside air therein, and an auxiliary inside air door for opening and closing said auxiliary inside air intake port; and said auxiliary inside air door is moved at a position to open said auxiliary inside air intake port and to guide outside air introduced from said outside air intake port into said gap when said inside/outside air switching door is moved at said intermediate position.

3. The air conditioning apparatus according to claim 1, further comprising:

a filter support member disposed within said inside/outside air switching box at a downstream air side of said wall portion of said inside/outside air switching door to be moved independently with said inside/outside air switching door; and a second deodorizing filter for deodorizing a malodorous particle in air, said second deodorizing filter being supported by said filter support member to be moved integrally with said filter support member.

4. The air conditioning apparatus according to claim 3, wherein:

when it is necessary to deodorize outside air introduced from said outside air intake port when said wall portion of said inside/outside air switching door opens said outside air intake port and closes said inside air intake port, said filter support member is controlled to move at a side of said outside air intake port in such a manner that outside air introduced from said outside air intake port passes through said second deodorizing filter; and when it is not necessary to deodorize outside air introduced from said outside air intake port, said filter support member is controlled to move at a downstream air side of said wall portion in such a manner that outside air introduced from said outside air intake port does not pass through said second deodorizing filter.

5. The air conditioning apparatus according to claim 3, wherein:

when it is necessary to deodorize inside air introduced from said inside air intake port when said wall portion of said inside/outside air switching door opens said inside air intake port and closes said outside air intake port, said filter support member is controlled to move at a side of said inside air intake port in such a manner that inside air introduced from said inside air intake port passes through said second deodorizing filter; and when it is not necessary to deodorize inside air introduced from said inside air intake port, said filter support member is controlled to move at a downstream air side of said wall portion in such a manner that inside air introduced from said inside air intake port does not pass through said second deodorizing filter.

6. The air conditioning apparatus according to claim 1, wherein:

said inside/outside air switching door is a rotary door being rotated around a rotary center;

said wall portion is an arc-shaped circumferential wall of said rotary door;

said outside air intake port and said inside air intake port are opened and closed by rotating said circumferential wall of said rotary door; and said first deodorizing filter is disposed radially inside said circumferential wall to form a predetermined gap therebetween and to rotate integrally with said rotary door.

7. The air conditioning apparatus according to claim 1, wherein:

a ratio of an amount of outside air introduced from said outside air intake port to a total amount of air introduced from both of said outside air intake port and said inside air intake port is less than 30%, when said inside/outside air switching door is moved at said intermediate position.

8. The air conditioning apparatus according to claim 1, further comprising:

an outside air odor sensor for detecting a malodorous particle of outside air, wherein:

said inside/outside air switching door is moved at said intermediate position when an outside air odor value detected by said outside air odor sensor is more than a predetermined value.

9. An air conditioning apparatus for a vehicle, comprising:

an inside/outside air switching box having an outside air intake port for introducing outside air therein, an inside air intake port for introducing inside air therein, and an air outlet through which the introduced air flows outside said inside/outside air switching box;

an inside/outside air switching door having a wall portion, said inside/outside air switching door being disposed in said inside/outside air switching box to open and close said outside air intake port and said inside air intake port by moving said wall portion;

a filter support member disposed within said inside/outside air switching box at a downstream air side of said wall portion of said inside/outside air switching door to be moved independently with said inside/outside air switching door; and a first deodorizing filter for deodorizing a malodorous particle in air, said first deodorizing filter being supported by said filter support member to be moved integrally with said filter support member, wherein:

when it is necessary to deodorize outside air introduced from said outside air intake port when said wall portion of said inside/outside air switching door opens said outside air intake port and closes said inside air intake port, said filter support member is controlled to move at a side of said outside air intake port in such a manner that outside air introduced from said outside air intake port passes through said first deodorizing filter; and when it is not necessary to deodorize outside air introduced from said outside air intake port, said filter support member is controlled to move at a downstream air side of said wall portion in such a manner that outside air introduced from said outside air intake port does not pass through said first deodorizing filter.

10. The air conditioning apparatus according to claim 9, wherein:

when it is necessary to deodorize inside air introduced from said inside air intake port when said wall portion of said inside/outside air switching door opens said inside air intake port and closes said outside air intake port, said filter support member is controlled to move at a side of said inside air intake port in such a manner that inside air introduced from said inside air intake port passes through said first deodorizing filter; and when it is not necessary to deodorize inside air introduced from said inside air intake port, said filter support member is controlled to move at a downstream air side of said wall portion in such a manner that inside air introduced from said inside air intake port does not pass through said first deodorizing filter.

11. The air conditioning apparatus according to claim 10, further comprising:

a second deodorizing filter for deodorizing a malodorous particle in air, said second deodorizing filter being disposed at a downstream air side of said wall portion of said inside/outside air switching door to be moved integrally with said wall portion and to form a predetermined gap between said second deodorizing filter and said wall portion, wherein:

said inside/outside air switching door and said second deodorizing filter are disposed in such a manner that outside air introduced from said outside air intake port flows through said air outlet of said inside/outside air switching box after passing through said gap and said second deodorizing filter and inside air introduced from said inside air intake port directly flows through said air outlet of said inside/outside air switching box, when said inside/outside air switching door is moved at an intermediate position in which each of said outside air intake port and said inside air intake port is opened in an intermediate opening degree by said wall portion.

12. The air conditioning apparatus according to claim 10, further comprising:

an outside air odor sensor for detecting a malodorous particle of outside air; and an outside air temperature sensor for detecting a temperature of outside air, wherein:

when an outside air odor value detected by said outside air odor sensor is more than a predetermined value and an outside air temperature detected by said outside air temperature sensor is lower than a predetermined temperature, said inside/outside air switching door is moved to set a whole outside air mode in which said outside air intake port is fully opened and said inside air intake port is fully closed, and said filter support member is moved at a side of said outside air intake port in such a manner that outside air introduced from said outside air intake port passes through said first deodorizing filter.

13. The air conditioning apparatus according to claim 10, further comprising:

an inside air odor sensor for detecting a malodorous particle of inside air, wherein:

when an inside air odor value detected by said inside air odor sensor is more than a predetermined value and said inside/outside air switching door is moved to set a whole inside air mode in which said outside air intake port is fully closed and said inside air intake port is fully opened, said filter support member is moved at a side of said inside air intake port in such a manner that inside air introduced from said inside air intake port passes through said first deodorizing filter.

14. The air conditioning apparatus according to claim 9, wherein:

said wall portion of said inside/outside air switching door has a supporting shaft provided to extend in a direction perpendicular to a moving direction of said wall portion;

said inside/outside air switching box has a groove portion at a position corresponding to said supporting shaft of said wall portion; and said supporting shaft is movably inserted into and rotatably supported by said groove portion.

15. The air conditioning apparatus according to claim 14, further comprising:

a sealing member disposed between said supporting shaft and said groove portion to prevent air flows between said supporting shaft and said groove portion.

16. The air conditioning apparatus according to claim 15, wherein:

said sealing member includes two side plates each made of a low frictional material, and an elastic member disposed between said two side plates; and said side plates are compressed between said wall portion of said inside/outside air switching door and said groove portion by the elastic force of said elastic member.

17. The air conditioning apparatus according to claim 9, wherein:

said inside/outside air switching door is a rotary door being rotated around a rotary center;

said wall portion is an arc-shaped circumferential wall of said rotary door;

said outside air intake port and said inside air intake port are opened and closed by rotating said circumferential wall of said rotary door;

said filter support member is disposed to rotate around said rotary center; and said first deodorizing filter is rotated integrally with said filter support member.

18. An air conditioning apparatus for a vehicle having a passenger compartment, said air conditioning apparatus comprising:

an air conditioning case having an outside air intake port for introducing outside air, an inside air intake port for introducing inside air, and an air outlet through which the introduced air is blown out toward the passenger compartment;

an inside/outside air switching door disposed in said air conditioning case to open and close said outside air intake port and said inside air intake port;

a blower unit for blowing air introduced from said outside air intake port and said inside air intake port toward the passenger compartment; and a deodorizing filter for deodorizing a malodorous particle in air, wherein:

said inside/outside air switching door is moved to set an inside/outside air mode in which both of said outside air intake port and said inside air intake port are opened; and said deodorizing filter is disposed in such a manner that only outside air introduced from said outside air intake port passes through said deodorizing filter in said inside/outside air mode.

19. The air conditioning apparatus according to claim 18, wherein:

said outside air intake port includes a first outside air intake portion and a second outside air intake portion;

said deodorizing filter is disposed in said first outside air intake portion to deodorize outside air flowing through said first outside air intake portion.

20. The air conditioning apparatus according to claim 19, wherein:

in said inside/outside air mode, an opening area of said first outside air intake portion is smaller than that of said second outside air intake portion.

21. The air conditioning apparatus according to claim 20, wherein:

in said inside/outside air mode, the opening area of said first outside air intake portion is smaller than that of said inside air intake port.

22. The air conditioning apparatus according to claim 19, wherein:

in said inside/outside air mode, said inside/outside air switching door opens both of said first outside air intake portion and said inside air intake port and closes said second outside air intake portion.

23. The air conditioning apparatus according to claim 19, further comprising:

an inside air odor sensor for detecting a malodorous particle of inside air within the passenger compartment, wherein:

said inside/outside air switching door is moved to set a whole inside air mode in which only inside air is introduced from said inside air intake port, when an inside air odor value detected by said inside air odor sensor is lower than a predetermined value; and said inside/outside air switching door is moved to set said inside/outside air mode when the inside air odor value detected by said inside air odor sensor is higher than the predetermined value.

24. The air conditioning apparatus according to claim 23, wherein:

said inside air odor sensor includes a $CO_2$ sensor for detecting $CO_2$ concentration in inside air within the passenger compartment;

said inside/outside air switching door is moved to set said whole inside air mode when a $CO_2$ concentration detected by said $CO_2$ sensor is lower than a set value; and said inside/outside air switching door is moved to set said inside/outside air mode when the $CO_2$ concentration detected by said $CO_2$ sensor is higher than the set value.

25. The air conditioning apparatus according to claim 19, further comprising:

an outside air odor sensor for detecting a malodorous particle of outside air, wherein:

said inside/outside air switching door is moved to set a whole outside air mode in which only outside air is introduced from said second outside air intake portion, when an outside air odor value detected by said outside air odor sensor is lower than a predetermined value; and said inside/outside air switching door is moved to set said inside/outside air mode when the outside air odor value detected by said outside air odor sensor is higher than the predetermined value.

* * * * *

UNITED STATES PATENT AND TRADEMARK OFFICE
CERTIFICATE OF CORRECTION

PATENT NO. : 5,876,277
DATED : March 2, 1999
INVENTOR(S) : Yukio Uemura et al

It is certified that error appears in the above-identified patent and that said Letters Patent is hereby corrected as shown below:

Col. 2, line 60, delete "passes" and substitute --pass-- therefor

Col. 3, line 11, delete "passes" and substitute --pass-- therefor

Col. 3, line 30, delete "cause"

Col. 4, line 51, delete "Preferring" and substitute --Referring-- therefor

Col. 6, line 38, delete "a"

Col. 11, line 14, delete "(B2)" and substitute --($B_2$)-- therefor

Col. 11, line 16, delete "(B2)" and substitute --($B_2$)-- therefor

Col. 12, line 34, after "it" insert --is--

Col. 12, line 52, delete "in" and substitute --for-- therefor

Col. 13, line 27, delete "($B_2$)from" and substitute --($B_2$) from-- therefor

Col. 13, line 31, delete "$B_1$" and substitute --($B_1$)-- therefor

Col. 15, line 23, delete "descrived" and substitute --described-- therefor

Col. 15, line 48, delete "B2" and substitute --($B_2$)-- therefor

Col. 17, line 18, delete "a"

Col. 17, line 22, delete "may be not" and substitute --may not be-- therefor

Col. 17, line 49, delete "is" and substitute --are-- therefor

Col. 17, line 57, delete "form" and substitute --foam-- therefor

Col. 17, line 65, delete "embodiments" and substitute --embodiment-- therefor

Col. 18, line 3, delete "passes" and substitute --passing-- therefor

UNITED STATES PATENT AND TRADEMARK OFFICE
CERTIFICATE OF CORRECTION

PATENT NO. : 5,876,277
DATED : March 2, 1999
INVENTOR(S) : Yukio Uemura et al

It is certified that error appears in the above-indentified patent and that said Letters Patent is hereby corrected as shown below:

Col. 18, line 40, delete "similarly" and substitute --Similarly-- therefor

Col. 19, line 17, after "operatively" insert --linked--

Col. 20, line 10, delete "percents" and substitute --percent-- therefor

Col. 20, line 24, after "like" insert --shape--

Col. 21, line 47, delete "include" and substitute --includes-- therefor

Col. 23, line 10, delete "cause"

Col. 23, line 45, after "it" insert --is--

Col. 23, line 48, delete "It" and substitute --Therefore, it-- therefor

Col. 24, line 54, delete "bower" and substitute --blower--

Col. 26, line 6, delete "degree" and substitute --degrees-- therefor

Col. 26, line 19, delete "are" and substitute --is-- therefor

Col. 26, line 21, delete "The" and substitute --the--

Signed and Sealed this

Fifteenth Day of February, 2000

Attest:

Attesting Officer

Q. TODD DICKINSON

Commissioner of Patents and Trademarks